US012386775B2

(12) United States Patent
Narayanasamy et al.

(10) Patent No.: US 12,386,775 B2
(45) Date of Patent: Aug. 12, 2025

(54) HIGH SPEED PASSIVE SERIAL CONFIGURATION OF FPGA BY MCU USING QUAD OR OCTAL SPI FLASH

(71) Applicant: Cypress Semiconductor Corporation, San Jose, CA (US)

(72) Inventors: Rajagopal Narayanasamy, Bangalore (IN); Ashwin Nair, Ernakulam (IN); Sanat Kumar Mishra, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 18 days.

(21) Appl. No.: 18/440,653

(22) Filed: Feb. 13, 2024

(65) Prior Publication Data
US 2025/0123991 A1 Apr. 17, 2025

Related U.S. Application Data

(60) Provisional application No. 63/589,759, filed on Oct. 12, 2023.

(51) Int. Cl.
G06F 13/42 (2006.01)
G06F 13/40 (2006.01)

(52) U.S. Cl.
CPC ...... G06F 13/4282 (2013.01); G06F 13/4068 (2013.01)

(58) Field of Classification Search
CPC .............. G06F 13/4282; G06F 13/4068
See application file for complete search history.

(56) References Cited

U.S. PATENT DOCUMENTS

| 6,560,665 B1* | 5/2003 | Resler ................ G06F 15/7814 710/305 |
| 6,567,518 B1* | 5/2003 | Weir .................... H04Q 1/155 379/333 |
| 2009/0292978 A1* | 11/2009 | Miyama ............. G06F 11/1008 711/E12.001 |

(Continued)

FOREIGN PATENT DOCUMENTS

CN 104951334 A 9/2015

OTHER PUBLICATIONS

"Configuring Cyclone FPGAs", Cyclone Device Handbook, vol. 1, Altera Corporation, May 2006, 52 pages.

(Continued)

*Primary Examiner* — Henry Tsai
*Assistant Examiner* — Harry Z Wang

(57) ABSTRACT

A system to perform high speed passive serial configuration of an FPGA is disclosed. The system includes an MCU that includes an interface, an FPGA coupled to the MCU over the interface, and a flash memory coupled to the MCU and to the FPGA over the interface. The flash memory includes MCU firmware for the MCU and FPGA configuration data for the FPGA. To perform passive serial configuration of the FPGA, the MCU is operable to at least: configure the flash memory to an input/output (IO) mode, place the FPGA in a configuration mode, send a read command over the interface to the flash memory for the FPGA configuration data, and continuously provide a clock signal over the interface to the flash memory until the FPGA configuration data is entirely read.

20 Claims, 19 Drawing Sheets

(56) References Cited

U.S. PATENT DOCUMENTS

| | | | | |
|---|---|---|---|---|
| 2010/0262759 A1* | 10/2010 | Borchers | ............... | G06F 3/0619 |
| | | | | 710/305 |
| 2012/0131253 A1* | 5/2012 | McKnight | ........... | G06F 13/1668 |
| | | | | 710/308 |
| 2020/0183785 A1* | 6/2020 | Shin | ....................... | H03M 13/35 |
| 2023/0259465 A1* | 8/2023 | Zhu | ..................... | G06F 13/1668 |
| | | | | 710/105 |

OTHER PUBLICATIONS

"AN 006: Configuring Trion™ FPGAs", Efinix, May 2023, 63 pages.
Takahiro Kuwano, "Connecting Cypress SPI Serial Flash to Configure Xilinx FPGAs", Cypress Semiconductor Corporation, Jun. 2, 2020, 9 pages.
"ECP5 and ECP5-5G sysCONFIG Usage Guide", Lattice Semiconductor Corp., Mar. 2018, 62 pages.
"Vivado Design Suite User Guide: Programming and Debugging", Advanced Micro Devices, Inc., 474 pages, Oct. 19, 2023.
"Using the Serial Peripheral Interface to Communicate Between Multiple Microcomputers", Freescale Semiconductor, Inc., 2004, 28 pages.
Misha Sadeghi, et al., "Reducing Reconfiguration Time in FPGAs", 27th Iranian Conference on Electrical Engineering (ICEE2019), IEEE, 2019, Downloaded on Mar. 22, 2024, 5 pages.
"Operating Requirements for Altera Devices", Altera Corporation, 1999, 14 pages.

* cited by examiner

| S/# | Parameter | Value | Unit | Remarks |
|---|---|---|---|---|
| 1 | Height | 1920 | | |
| 2 | Width | 1080 | | |
| 3 | Pixel size | 12 | bits per pixel | |
| 4 | frame size | 24.8832 | Mbit | |
| 5 | bandwidth | 3200 | Mbit/sec | |
| 6 | Time for one frame | 9.3312 | mS | |
| 7 | Max. # of frames sent to Host | 30 | | |
| 8 | FPGA config.time | 224 | mS | |
| 9 | Image streaming time | 276 | mS | Assuming frequency of assembly line activity = once in a second = 1 Hz = 1000mS and 50% duty cycle |
| 10 | idle time | 500 | mS | |
| 11 | power consumption during config. | 432 | mW | |
| 12 | power consumption during streaming | 432 | mW | |
| 13 | Power consumption during idle time (no streaming) | 400 | mw | |
| 14 | power consumption during RESET (low power mode) | 12.5 | mW | |
| 15 | Energy consumption during FPGA config. | 96768 | uWS | |
| 16 | Energy consumption during Image streaming time | 119232 | uWS | |
| 17 | Energy consumption during idle time | 6250 | uWS | |
| 18 | Energy consumption in existing method | 416000 | uWS | |
| 19 | Energy consumption in embodiments of the application | 222250 | uWS | |
| 20 | Energy saving | 47% | | |

FIG. 6A

| Programming time of a FPGA configuration file for 120K LUT of size 3.4MB @ 30 MHz ||||
|---|---|---|---|
| SPI Bus Width | Theoretical Boot Up Time (in Seconds) | Actual Measured Boot Up Time (in Seconds) | Faster by |
| X1 (existing method) | 0.906 | 1.4 | |
| X4 (This invention) | 0.226 | 0.448 | 68% |
| X8 (This invention) | 0.113 | 0.224 | 84% |

FIG. 6B

HIGH SPEED PASSIVE SERIAL CONFIGURATION OF FPGA BY MCU USING QUAD OR OCTAL SPI FLASH

CROSS REFERENCE TO RELATED APPLICATIONS

This application claims the benefit of U.S. Provisional Application No. 63/589,759 filed on Oct. 12, 2023, the disclosure of which is incorporated herein by reference in its entirety.

TECHNICAL FIELD

This disclosure generally relates to field-programmable gate arrays (FPGAs), and more specifically, to high speed passive serial configuration of FPGA by a microcontroller unit (MCU).

BACKGROUND

A field-programmable gate array (FPGA) is a type of integrated circuit (IC) that can be programmed or reprogrammed after manufacturing. FPGAs can be configured to perform various digital functions by using active serial configuration or passive serial configuration.

In active serial FPGA configuration, the FPGA itself reads the configuration binary file from external memory. A disadvantage of this type of serial configuration is that it requires separate external memory and separate programming interface to store the firmware for a microcontroller unit (MCU). In passive serial FPGA configuration, an MCU (external to the FPGA) is coupled to read the configuration binary file from external memory and send the configuration file to the FPGA. A disadvantage of this type of serial configuration is that it requires an MCU that supports ×2, ×4, ×8 or higher serial interfaces for the respective FPGA configuration widths. In systems where flexibility and fast processing capabilities are required, using active serial FPGA configuration typically results in increased costs (e.g., because an additional external memory is required to store the MCU firmware) and using passive serial FPGA configuration is typically too slow (e.g., because the external MCU is required to read the configuration file). In addition, FPGAs with higher logic element (LE) count typically have higher configuration file sizes and respectively longer configuration times.

In systems where real-time processing is required (e.g., such as industrial imaging or video-processing applications), FPGAs typically do not support remote configuration updates and generally require a separate bridge (e.g., such as USB-JTAG or USB-SPI bridge) for configuration. In addition, the use of FPGAs in such systems results in increased power consumption because an FPGA may need to remain in active user mode after configuration.

BRIEF DESCRIPTION OF THE DRAWINGS

The disclosure is illustrated by way of example, and not of limitation, in the figures of the accompanying drawings.

FIG. 6A illustrates an example parameter table for a power saving calculation example in a system configured according to the techniques described herein.

FIG. 6B illustrates a table with example test results for configuration time savings in a system according to the techniques described herein.

DETAILED DESCRIPTION

Figure 1:
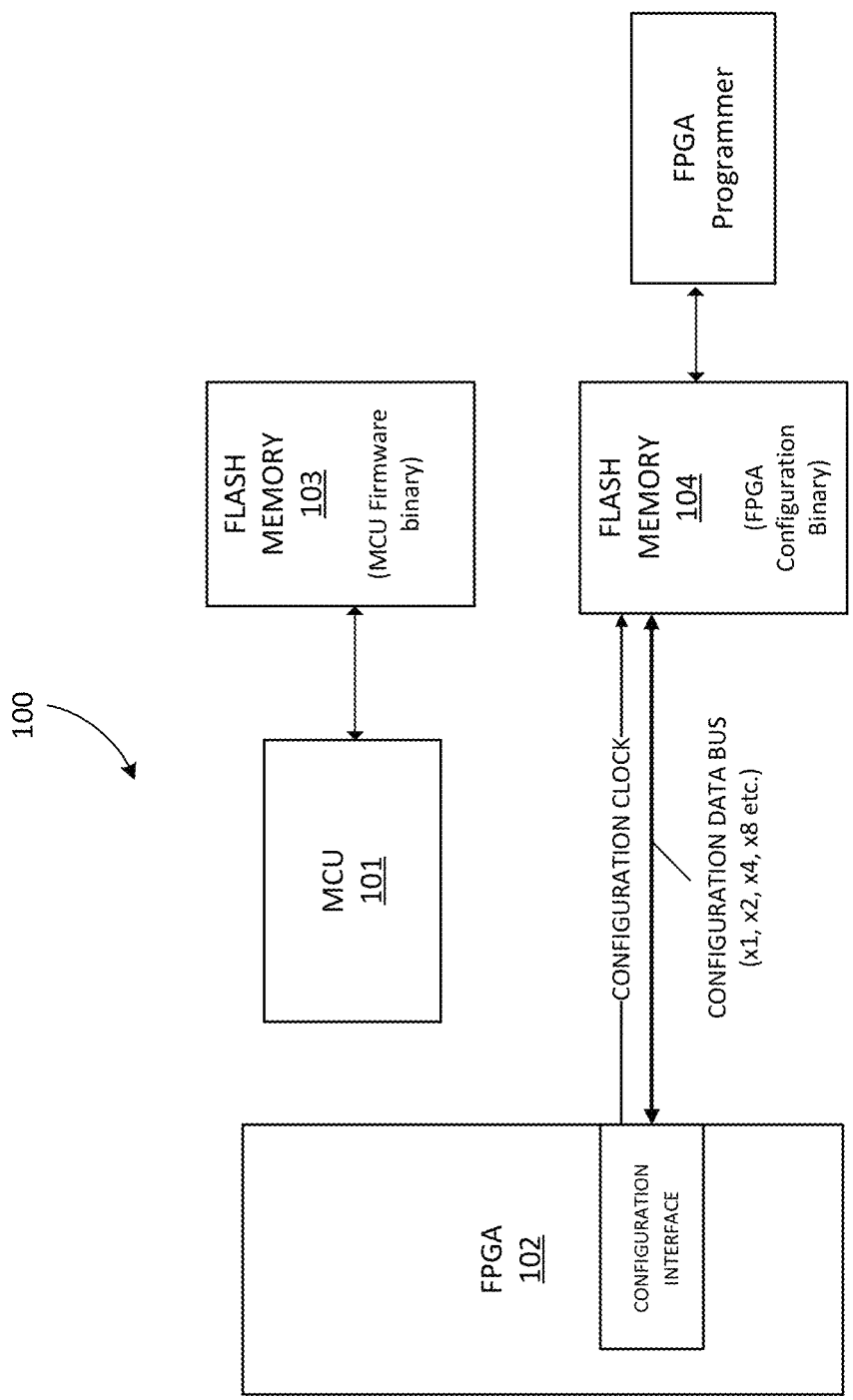
FIG. 1 illustrates a block diagram of a conventional system with active serial FPGA configuration.

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

The following description sets forth numerous specific details such as examples of specific systems, components, methods, and so forth, in order to provide a good understanding of various embodiments of the techniques described herein for using an MCU with a standard SPI interface (×1) to support ×4/×8/×16/×32 passive serial FPGA configuration. It will be apparent to one skilled in the art, however, that at least some embodiments may be practiced without these specific details. In other instances, well-known components, elements, or methods are not described in detail or are presented in a simple block diagram format in order to avoid unnecessarily obscuring the techniques described herein. Thus, the specific details set forth hereinafter are merely examples. Particular embodiments may vary from these example details and still be contemplated to be within the spirit and scope of the present disclosure.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the invention. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

According to one aspect, a system to perform passive serial configuration of an FPGA is provided. The system includes, but not limited to, an MCU that includes an interface (e.g., SPI interface), an FPGA coupled to the MCU over the interface, and a flash memory (e.g., QSPI flash memory) coupled to the MCU and to the FPGA over the interface. The flash memory may include MCU firmware for the MCU and FPGA configuration data for the FPGA. To perform passive serial configuration of the FPGA, the MCU may be operable to at least: configure the flash memory to an input/output (IO) mode, place the FPGA in a configuration mode, send a read command over the interface to the flash memory for the FPGA configuration data, and continuously provide a clock signal over the interface to the flash memory until the FPGA configuration data is entirely read. In response to the read command, the flash memory may be operable to place the FPGA configuration data onto the interface. The FPGA may be operable to read the FPGA configuration data from the interface and configure the FPGA based on the FPGA configuration data.

According to another aspect, a system to perform passive serial configuration of an FPGA is provided. The system includes, but not limited to, an MCU that includes a first interface (e.g., SPI interface) and a second interface (e.g., SPI interface). The system further includes an FPGA coupled to the MCU over the first interface and the second interface. The system further includes a first flash memory (e.g., QSPI flash memory) coupled to the MCU and to the FPGA over the first interface, where the first flash memory may include MCU firmware for the MCU and first data of FPGA configuration data for the FPGA. The system further includes a second flash memory (e.g., QSPI flash memory) coupled to the MCU and to the FPGA over the second interface, where the second flash memory may include second data of the FPGA configuration data. To perform passive serial configuration of the FPGA, the MCU may be operable to at least: configure the first flash memory and the second flash memory to an IO mode, place the FPGA in a configuration mode, respectively send a read command over the first interface to the first flash memory for the first data of the FPGA configuration data, and over the second interface to the second flash memory for the second data of the FPGA configuration data, and continuously provide a first clock signal over the first interface to the first flash memory and to the second flash memory until the first data and the second data are entirely read. In response to the read command, the first flash memory may be operable to place the first data onto the first interface, and the second flash memory may be operable to place the second data onto the second interface. The FPGA may be operable to read the first data from the first interface, read the second data from the second interface, and configure the FPGA based on the first data and the second data that collectively form the FPGA configuration data.

According to yet another aspect, a system to perform passive serial configuration of an FPGA is provided. The system includes, but not limited to, a first MCU that includes a first interface (e.g., SPI interface) and a second MCU that includes a second interface (e.g., SPI interface). The system further includes a first flash memory (e.g., QSPI flash memory) coupled to the first MCU and to the FPGA over the first interface, where the first flash memory may include MCU firmware for the MCU and first data of FPGA configuration data for the FPGA. The system further includes a second flash memory (e.g., QSPI flash memory) coupled to the second MCU and to the FPGA over the second interface, where the second flash memory may include second data of the FPGA configuration data. To perform passive serial configuration of the FPGA, the first MCU may be operable to at least: configure the first flash memory to an IO mode, place the FPGA in a configuration mode, send a read command over the first interface to the first flash memory for the first data of the FPGA configuration data, and continuously provide a first clock signal over the first interface to the first flash memory until the first data is entirely read.

In an embodiment, the second MCU may be operable to at least: configure the second flash memory to an IO mode, send a read command over the second interface to the second flash memory for the second data of the FPGA configuration data, and notify the first MCU to switch a clock multiplexer to provide the first clock signal to the second flash memory, where the first MCU may continuously provide the first clock signal over the first interface to the second flash memory until the second data is entirely read. In response to the read command from the first MCU, the first flash memory may be operable to place the first data onto the first interface. In response to the read command from the second MCU, the second flash memory may be operable to place the second data onto the second interface. The FPGA may be operable to read the first data from the first interface, read the second data from the second interface, and configure the FPGA based on the first data and the second data that collectively form the FPGA configuration data.

FIG. 1 illustrates a block diagram of a system with active serial FPGA configuration. In system 100 of FIG. 1, an MCU 101 is coupled to a first flash memory 103 (e.g., SPI flash memory), which is configured to store the MCU firmware only. An FPGA 102 is coupled to a second flash memory 104 (e.g., SPI flash memory) over a configuration data bus (e.g., ×1, ×2, ×4, ×8 serial bus), where the second flash memory 104 is configured to store the FPGA configuration binary file. The main disadvantage of the system 100 in FIG. 1 is increased cost since a separate external memory and respective interface thereto are required for storing the MCU firmware.

Figure 2:
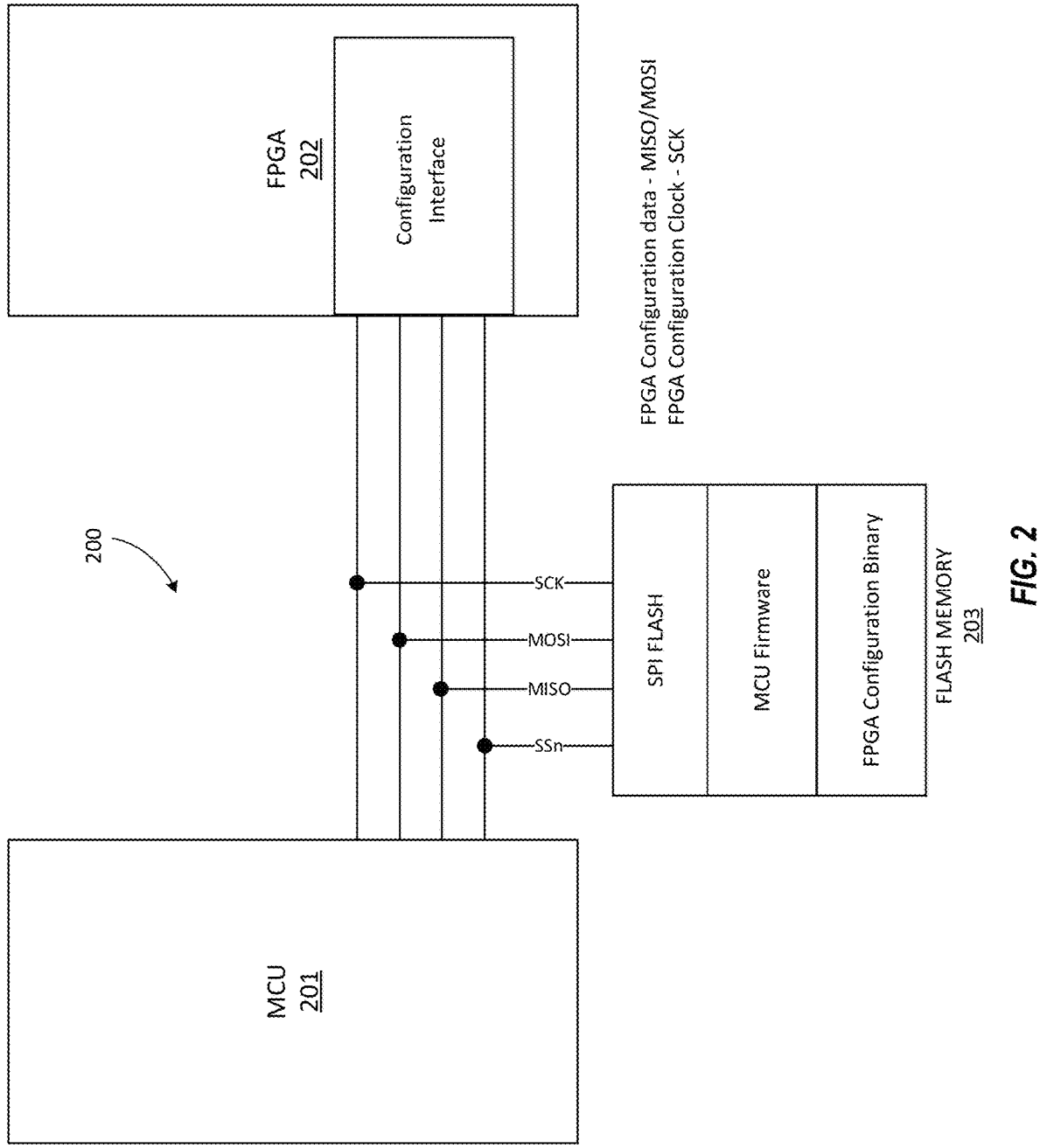
FIG. 2 illustrates a block diagram of a conventional system with passive serial FPGA configuration.

FIG. 2 illustrates a block diagram of a system with passive serial FPGA configuration. In system 200 of FIG. 2, an MCU 201, an FPGA 202, and a single flash memory 203 (e.g., SPI flash memory) are coupled over configuration interface, where the MCU 201 is configured to initiate passive FPGA configuration and the FPGA 202 is configured to read the configuration file from the flash memory 203 over the configuration interface. The main disadvantage of the system 200 in FIG. 2 is that it requires a (more expensive) MCU that supports ×2, ×4, ×8 or higher interfaces for the respective FPGA configuration width.

To address these and other disadvantages, described herein are various embodiments of techniques for using an MCU with a standard SPI interface (×1) to support ×4/×8 passive serial FPGA configuration. In an example embodiment, the techniques described herein provide a system with an MCU and a FPGA that are coupled to a single flash memory over a standard (×1) SPI interface where, based on the SPI clock signal, the MCU initiates the FPGA configuration and in response thereto the FPGA reads a configuration file from the flash memory over the SPI interface. This allows an MCU with a standard (×1) SPI interface to support ×4/×8 or higher passive serial FPGA configuration, while using a single flash memory that can store MCU firmware and other useful system data in addition to storing the FPGA configuration file.

Figure 3A:
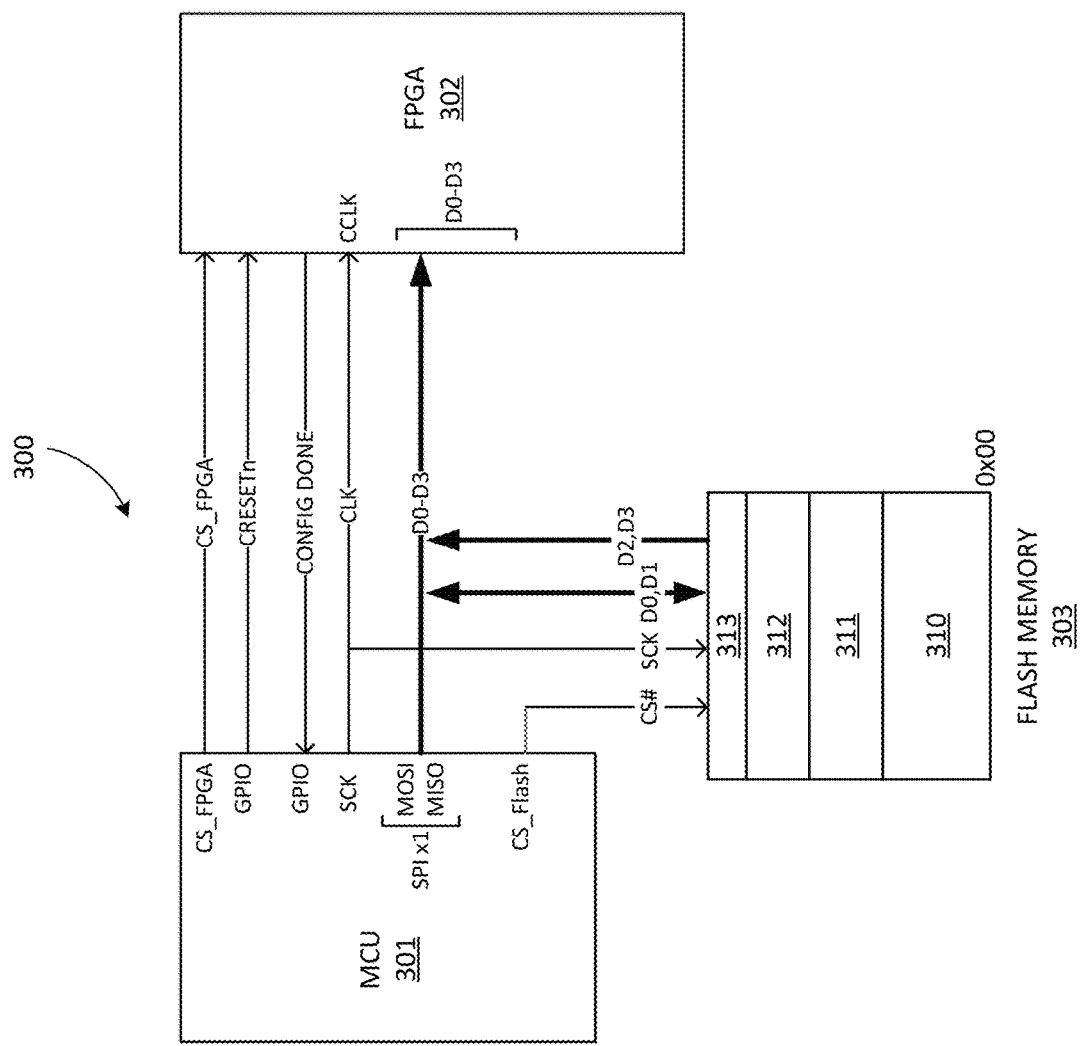
FIG. 3A illustrates a block diagram of a system with a quad (×4) serial peripheral interface (SPI) flash memory and an MCU with a standard SPI interface (×1), configured to support ×4 passive serial FPGA configuration according to an embodiment.

FIG. 3A illustrates a block diagram of a system with a quad (×4) SPI flash memory and an MCU with a standard (×1) SPI interface, configured to support ×4 passive serial FPGA configuration according to an embodiment. In system 300 of FIG. 3A, MCU 301 and FPGA 302 are coupled to a flash memory 303 (e.g., quad SPI (QSPI) flash memory) over a standard (×1) SPI bus. As shown, flash memory 303 may store, among other things, MCU firmware (and/or other data) 310, FPGA configuration binary file/data 311, and FPGA system-on-chip (SoC) firmware 312. Memory region 313 may be a free memory region of flash memory 303.

To configure the FPGA 302 in a passive serial ×4 mode, for example, the MCU 301 may issue a Quad Read command to the flash memory 303 and may continuously issue a SPI clock signal (SCK) until the end of configuration binary file 311. The MCU 301 may then discard the received data at its end, while the FPGA 302 is getting configured based on the configuration binary file 311 that is read from the flash memory 303 onto the SPI interface.

In accordance with the techniques described herein, the system 300 of FIG. 3A provides at least the following advantages:
up to 4 times faster FPGA configuration compared to ×1 mode;
the same flash memory 303 can be used both to store the FPGA configuration file and by the MCU 301 for other purposes (e.g., storing firmware, configuration table, etc.);
support for remote firmware update as the MCU 301 can easily update the MCU firmware 310 and FPGA configuration binary file 311 that are stored in the flash memory 303;
no separate interface is required to program the FPGA 302;
the MCU 301 can keep the FPGA 302 in reset to save power while in low power mode and dynamically reconfigure the FPGA 302 on low power mode exit; the end user of the system will not notice the configuration delay (e.g., on lower power mode exit) as such delay will be in the same range;
since the FPGA configuration mode may use static random access memory (SRAM) based implementation, there is no limit on the number of reconfiguration cycles;
this method can be extended to support ×8, ×16 and ×32 width modes to reduce configuration time by the respective factors.

Figure 3B:
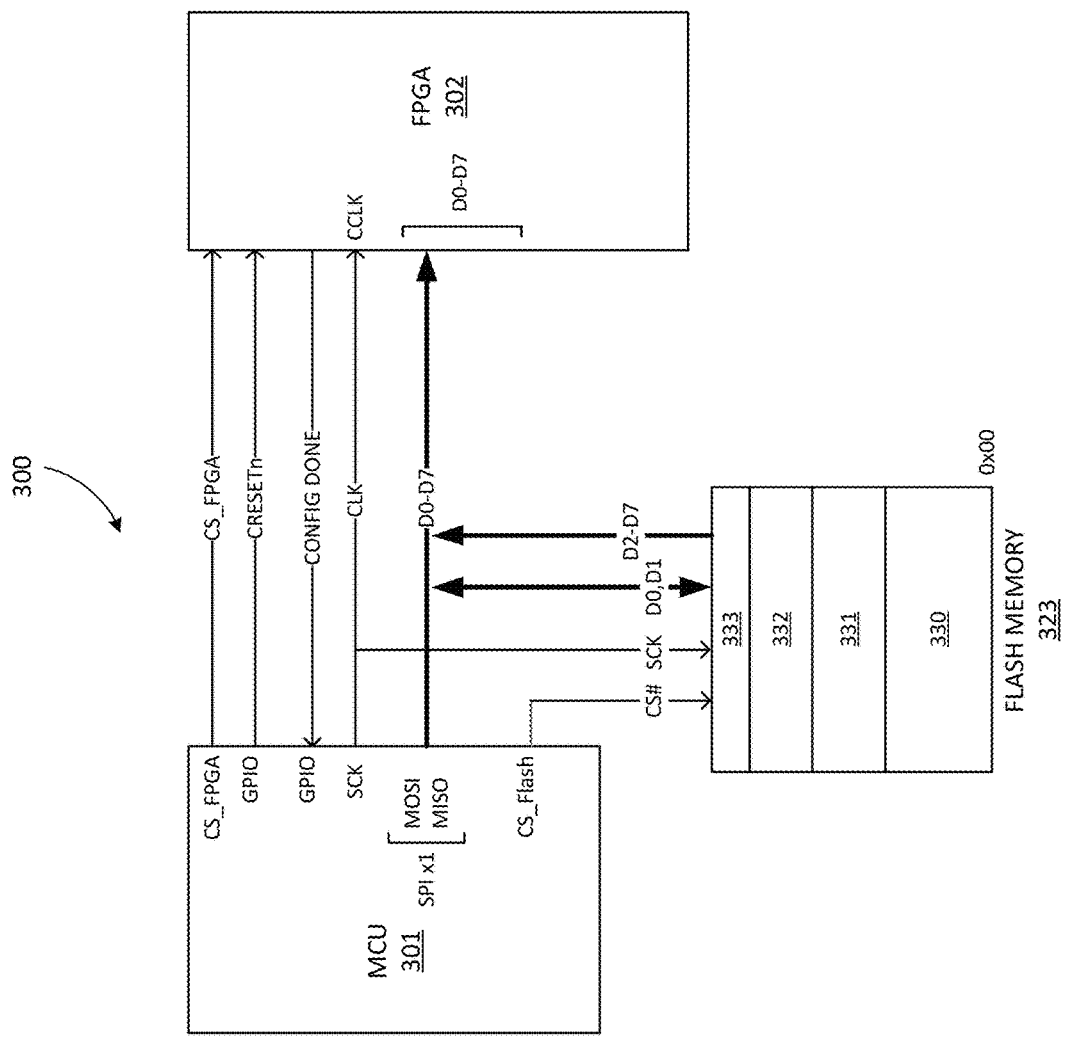
FIG. 3B illustrates a block diagram of a system with an octal (×8) SPI flash memory and an MCU with a standard SPI interface (×1), configured to support ×8 passive serial FPGA configuration according to an embodiment.

FIG. 3B illustrates a block diagram of a system with an octal (×8) SPI flash memory and an MCU with a standard SPI interface (×1), configured to support ×8 passive serial FPGA configuration according to an embodiment. In system 300 of FIG. 3B, the MCU 301 and the FPGA 302 are coupled to a flash memory 323 (e.g., octal SPI flash memory) over a standard (×1) SPI interface. As shown, the flash memory 323 may store MCU firmware and configuration data 330, FPGA configuration binary file 331, and FPGA SoC firmware 332. Memory region 333 may be a free memory region of flash memory 323.

To configure the FPGA 302 in passive serial ×8 mode, for example, the MCU 301 may issue an Octal Read command to the flash memory 323 and may continuously issue an SPI clock signal (SCK) until the end of configuration binary file 331. The MCU 301 may then discard the received data at its end, while the FPGA 302 is getting configured based on the configuration file 311 that is read from the flash memory 323 onto the SPI interface.

In accordance with the techniques described herein, the system 300 of FIG. 3B provides at least the following advantages:
up to 8 times faster FPGA configuration compared to ×1 mode;
the same flash memory 323 can be used both to store the FPGA configuration file 331 and by the MCU 301 for other purposes (e.g., storing firmware, configuration table, etc.);
support for remote firmware update as the MCU 301 can easily update the MCU firmware 330 and FPGA configuration binary file 331 that are stored in the flash memory 323;
no separate interface is required to program the FPGA 302;
the MCU 301 can keep the FPGA 302 in reset to save power while in low power mode, and to reconfigure the FPGA 302 on low power mode exit.

Figure 4:
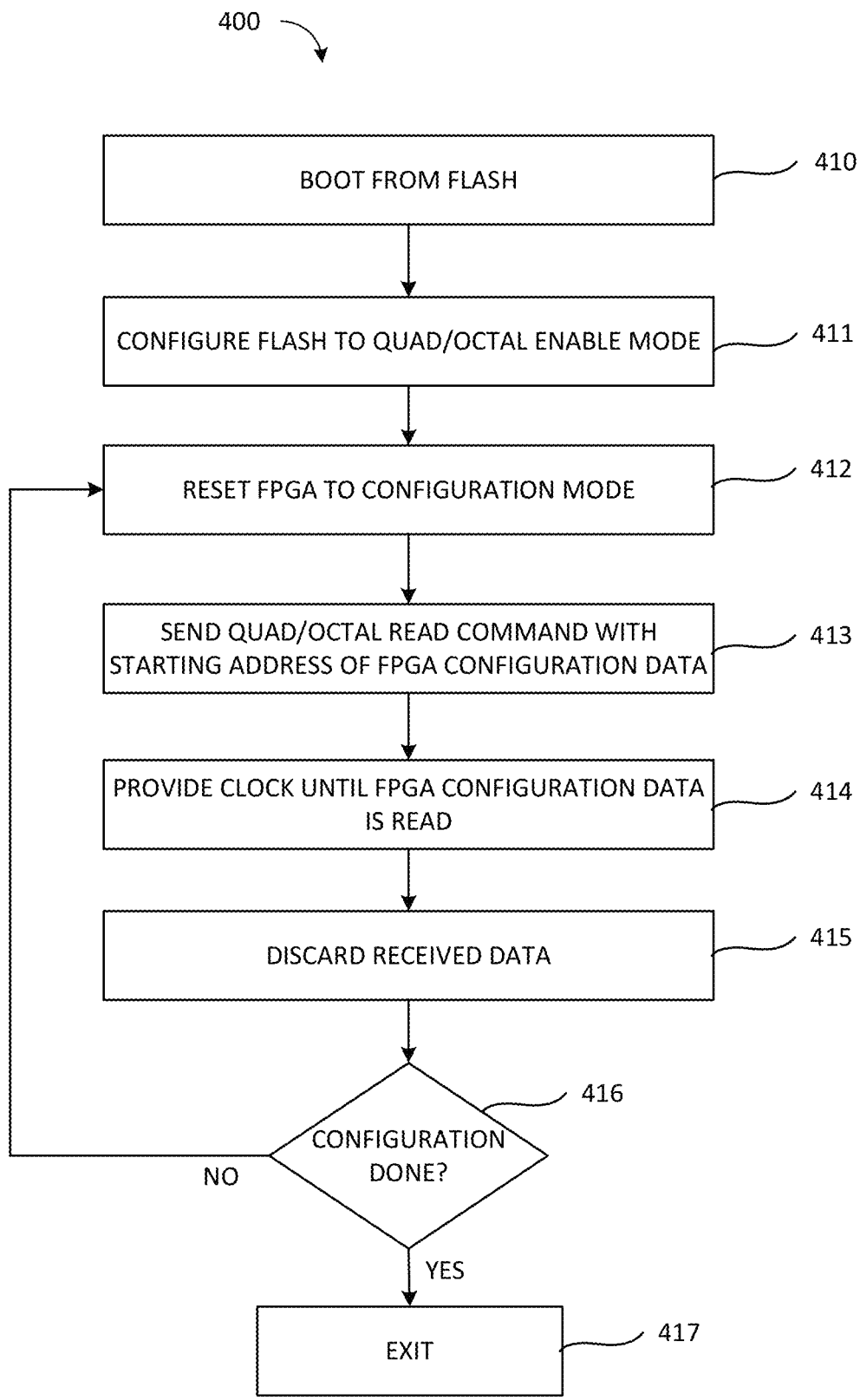
FIG. 4 illustrates a flow diagram of an example method for using an MCU with a standard SPI interface (×1) to support ×4/×8/×16/×32 passive serial FPGA configuration from an SPI flash memory, in accordance with the techniques described herein.

FIG. 4 illustrates a flow diagram of an example method for using an MCU with a standard SPI interface (×1) to support ×4/×8/×16/×32 passive serial FPGA configuration from an SPI flash memory, in accordance with the techniques described herein. For example, method 400 of FIG. 4 can be used in the example systems 300 illustrated in FIGS. 3A and 3B.

In the method 400 of FIG. 4, at block 410, the MCU logic flow starts with the MCU booting from the flash memory (e.g., flash memory 303/323 of FIG. 3A/3B). At block 411, the MCU may configure the flash memory to a Quad/Octal Enable mode, for example, by issuing or sending a mode command over the SPI interface to configure the flash memory to Quad/Octal Enable or input/output (IO) mode. At block 412, the MCU may reset the FPGA to configuration mode, for example, by issuing or sending a configuration or reset command over the SPI interface to place the FPGA in configuration mode. At block 413, the MCU may send a Quad/Octal Read command to the flash memory, with a starting address of the FPGA configuration binary file (e.g., FPGA configuration file 311/331 of FIG. 3A/3B). At block 414, the MCU may continuously provide a SPI clock signal until the FPGA configuration file is read out while discarding any data the MCU may receive over the SPI interface (block 415). When the FPGA configuration file is fully read out, at block 416, the MCU may determine whether the FPGA configuration is completed. If so, the MCU exits the logic flow; otherwise, the MCU proceeds to block 412 with the resetting of the FPGA back into configuration mode and sends another Quad/Octal Read command for the next FPGA configuration file (block 413).

In some embodiments, the techniques described herein provide for significant time savings when configuring the FPGA. For example, test results for a system with an SPI clock at 30 MHz and FPGA configuration file of 3.4 MB show that by using the techniques described herein, the configuration time can be reduced to less than 100 ms which will not be noticeable to the end user. Further, in some USB-related applications (e.g., such image capturing or video streaming applications), the techniques described herein allow the system to be kept in USB Standby mode (e.g., when no image/video data is being received) by keeping the FPGA in reset and to reconfigure the FPGA quickly when the system enters USB Active mode (e.g., when the system starts receiving image/video data). In some embodiments, the techniques described herein allow for storing both MCU firmware files and FPGA configuration files in the same SPI flash memory, thereby avoiding the need for a separate flash memory in the system. Further, the techniques described herein provide for reading and discarding, within the MCU, the FPGA configuration data received over the SPI interface while the FPGA is getting configured. Moreover, the techniques described herein also allow for using multiple, standard, low-cost QSPI flash memories to support ×8, ×16, ×32 passive serial configuration modes using an MCU with standard (×1) SPI interface, thereby providing significant bill-of-material (BOM) cost savings at the system level.

Figure 5A:
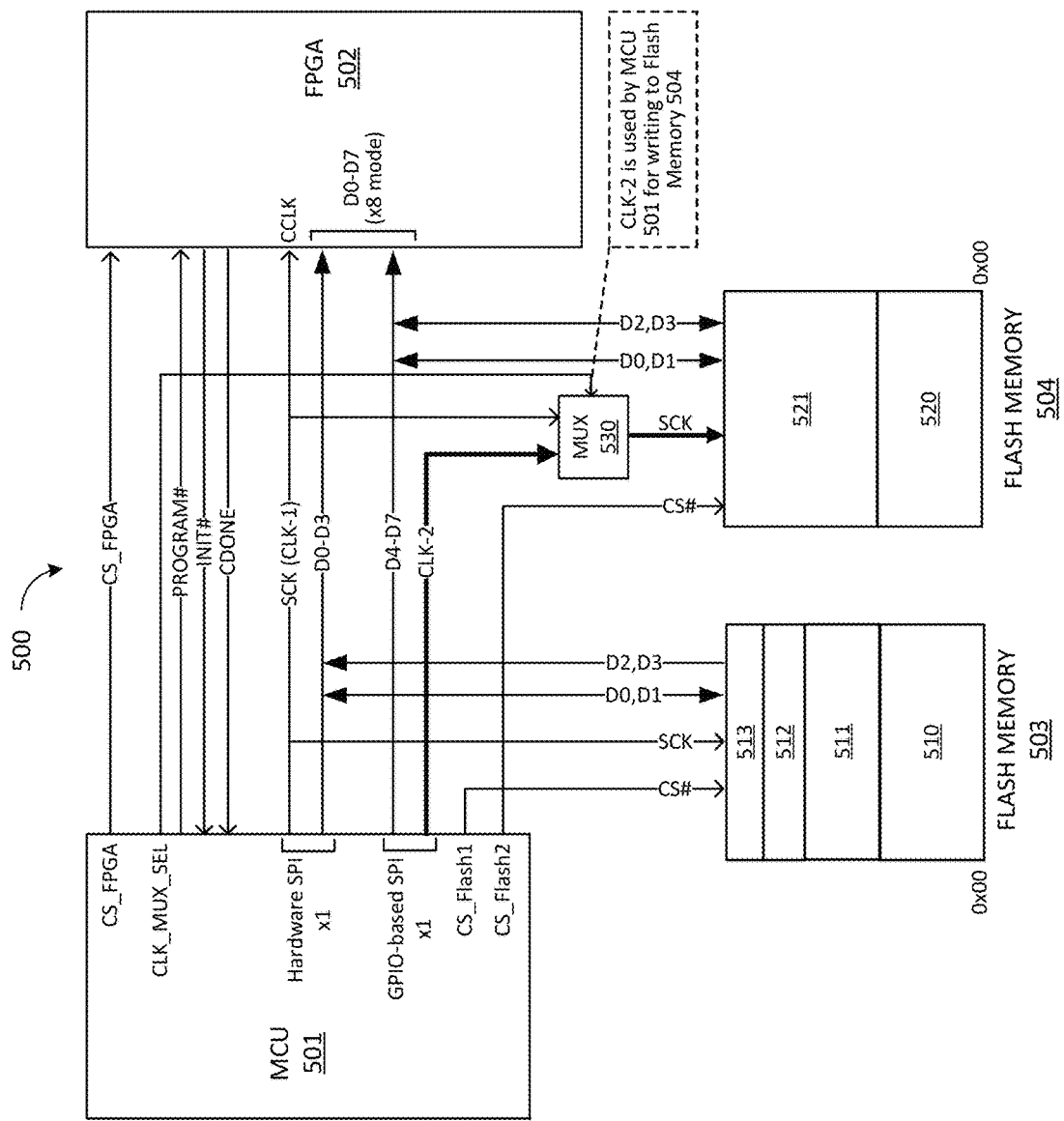
FIG. 5A illustrates a block diagram of a system with two quad (×4) SPI flash memories and an MCU with two standard SPI interfaces (×1), configured to write a configuration binary file for ×4 passive serial FPGA configuration in the two quad flash memories, according to an embodiment.

FIG. 5A illustrates a block diagram of a system with two quad (×4) SPI flash memories and a MCU with two standard SPI interfaces (×1), configured to write a configuration binary file for ×4 passive serial FPGA configuration in the two quad flash memories, according to an example embodiment. In system 500 of FIG. 5A, MCU 501 and the FPGA 502 are coupled to two quad (×4) flash memories 503-504 (e.g., QSPI flash memories) over two standard (×1) SPI interfaces. A clock multiplexer (MUX) 530 may be coupled the second flash memory 504 to multiplex a hardware SPI clock (CLK-1) and a general purpose input-output (GPIO) SPI clock (CLK-2) that are provided from the MCU 501 to the FPGA 502. The first flash memory 503 may be configured to store, among other things, MCU firmware and configuration data 510, first portion/data 511 of an FPGA configuration binary file/data, and FPGA SoC firmware 512. Memory region 513 may be a free memory region of the first flash memory 503. The second flash memory 504 may be configured to store second portion/data 520 of the FPGA configuration binary file/data. Memory region 521 may be a free memory region of the second flash memory 504.

In some embodiments, FIG. 5A also illustrates a block diagram of a write sequence for system 500 with the quad (×4) flash memories 503-504 and MCU 501 with two standard (×1) SPI interfaces (hardware SPI and GPIO-based SPI), in ×8 passive serial FPGA configuration. For example, to configure the FPGA 502 in passive serial ×4 mode, the MCU 501 may first program the quad flash memories 503-504 individually using independent SPI clocks. The MCU 501 may send a Quad Read command to the flash memories 503-504 from the hardware SPI and GPIO-based SPI interfaces, respectively. The clock from the hardware SPI interface can be routed to both flash memories 503-504, with the clock being routed to flash memory 504 through the MUX 530 (e.g., 2:1 MUX), to ensure data integrity and synchronization during FPGA configuration. Both SPI interfaces within the MCU 501 may then discard the received FPGA configuration data at their respective ends, while the FPGA 502 is getting configured based on the FPGA configuration binary file/data.

In accordance with the techniques described herein, the system 500 of FIG. 5A provides at least the following advantages:
- up to 8 times faster FPGA configuration compared to ×1 mode;
- the same flash memory can be used for other purposes (storing firmware, config table, etc.);
- support for remote firmware update as the MCU 501 can easily update the MCU firmware 510 and FPGA configuration binary file 511 that are stored in the flash memories 503-504;
- no separate interface is required to program the FPGA 502;
- the MCU 501 can keep the FPGA 502 in reset to save power while in low power mode and dynamically reconfigure the FPGA 502 on low power mode exit.

Figure 5B:
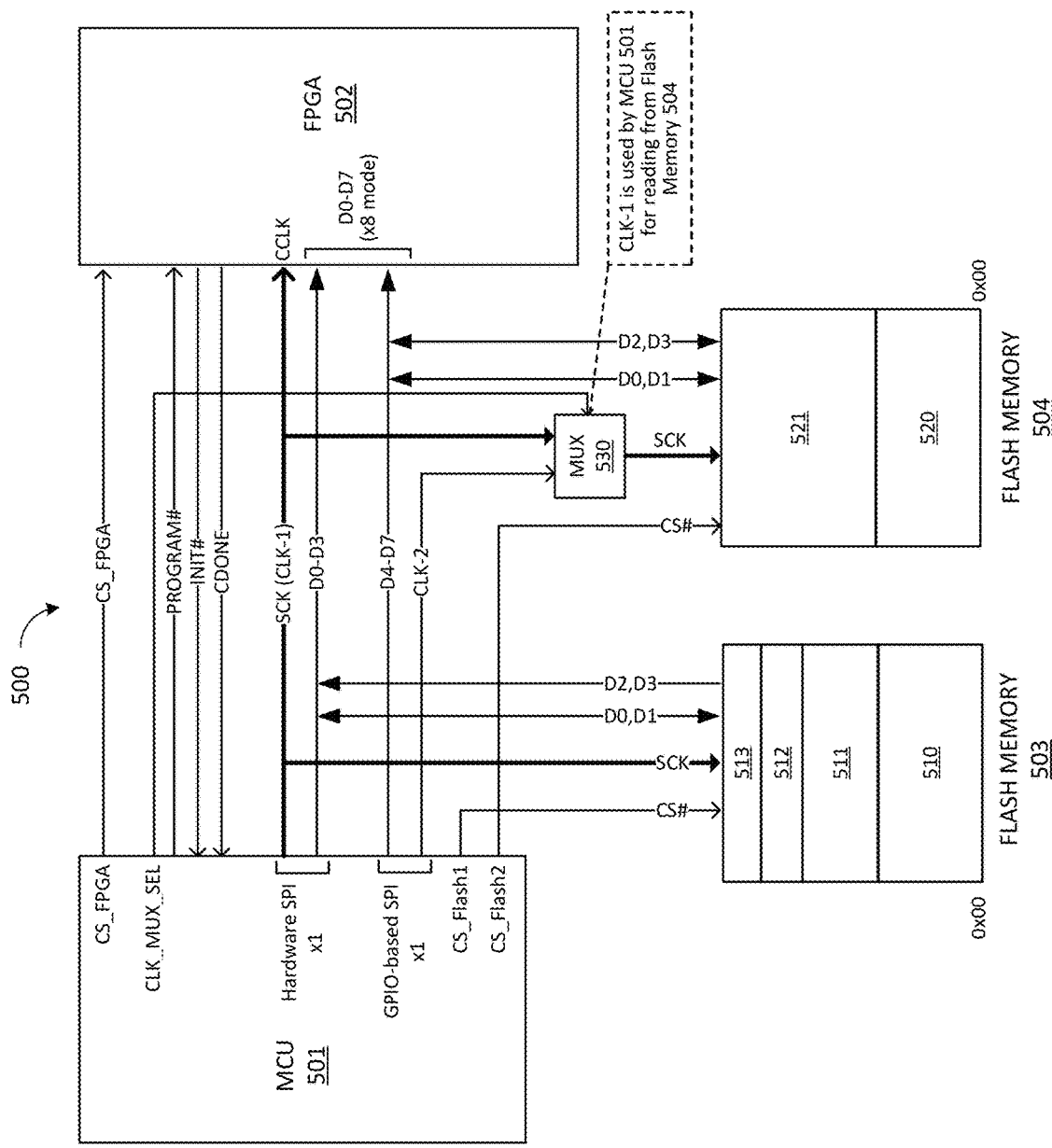
FIG. 5B illustrates a block diagram of a system with two quad (×4) SPI flash memories and an MCU with two standard SPI interfaces (×1), configured to read a configuration binary file for ×4 passive serial FPGA configuration from the two quad flash memories, according to an embodiment.

FIG. 5B illustrates a block diagram of a system with two quad (×4) SPI flash memories and a MCU with two standard SPI interfaces (×1), configured to read a configuration binary file for ×4 passive serial FPGA configuration from the two quad flash memories, according to an example embodiment. In the system 500 of FIG. 5B, MCU 501 and FPGA 502 are coupled to two quad (×4) flash memories 503-504 over two standard (×1) SPI interfaces. A clock multiplexer (MUX) 530 may be coupled the second flash memory 504 to multiplex a hardware SPI clock (CLK-1) and a GPIO SPI clock (CLK-2) that are provided from the MCU 501 to the FPGA 502. The first flash memory 503 may be configured to store, among other things, the MCU firmware and configuration data 510, first portion/data 511 of the FPGA configuration binary file/data, and the FPGA SoC firmware 512. Memory region 513 may be a free memory region of the first flash memory 503. The second flash memory 504 may be configured to store the second portion/data 520 of the FPGA configuration binary file/data. Memory region 521 may be a free memory region of the second flash memory 504.

In some embodiments, FIG. 5B also illustrates a block diagram of a read sequence for system 500 with the two quad (×4) flash memories 503-504 and the MCU 501 with two standard (×1) SPI interfaces (hardware SPI and GPIO-based SPI), in ×8 passive serial FPGA configuration. For example, to configure the FPGA 502 in passive serial ×8 mode, the MCU 501 may first program the two quad flash memories 503-504 individually using independent SPI clocks. The MCU 501 may send a Quad Read command to the two flash memories 503-504 from the hardware SPI and GPIO-based SPI interfaces, respectively. The clock from the hardware SPI interface can be routed to both flash memories 503-504, with the clock being routed to the flash memory 504 through the MUX 530 (e.g., 2:1 MUX) to ensure data integrity and synchronization during FPGA configuration. Both SPI interfaces within the MCU 501 may then discard the received FPGA configuration data at their respective ends, while the FPGA 502 is getting configured.

In accordance with the techniques described herein, the system 500 of FIG. 5B provides at least the following advantages:
- up to 8 times faster FPGA configuration compared to ×1 mode;
- the same flash memory can be used for other purposes (storing firmware, config table, etc.);
- support for remote firmware update as the MCU 501 can easily update the MCU firmware 510 and FPGA configuration binary file 511 that are stored in the flash memories 503-504;
- no separate interface is required to program the FPGA 502;
- the MCU 501 can keep the FPGA 502 in reset to save power while in low power mode and dynamically reconfigure the FPGA on low power mode exit.

FIG. 6A illustrates a parameter table for a power saving calculation example in a system configured according to the techniques described herein. In an example embodiment, in parameter table 600, based on the various system parameters it can be calculated that the system can take 500 ms for configuration and video capture, and 500 ms in the idle state, thereby resulting in 47% energy saving.

FIG. 6B illustrates a table with test results for configuration time savings in a system according to the techniques described herein. For example, referring to table 610, in a system with an SPI clock at 30 MHz and FPGA configuration file of 3.4 MB, the techniques described herein provide 68% time saving for ×4 passive serial FPGA configuration and 84% time saving for ×8 passive serial FPGA configuration, when compared to a conventional technique that uses a standard (×1) configuration.

Figure 7:
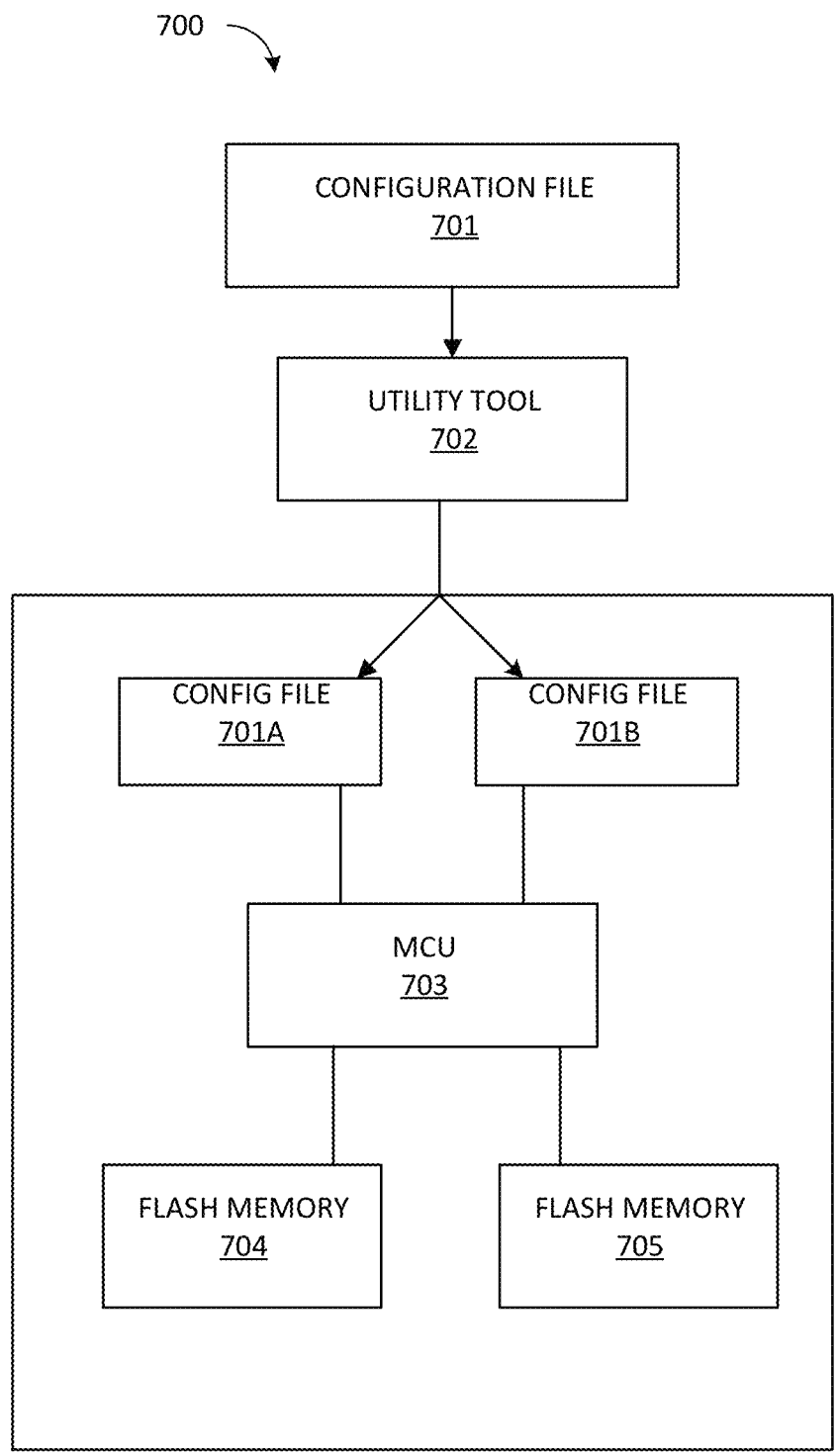
FIG. 7 illustrates a flow diagram of a method for splitting and programming a configuration file in a system with two quad (×4) SPI flash memories and an MCU with two standard (×1) SPI interfaces, in ×8 passive serial FPGA configuration according to an embodiment.

FIG. 7 illustrates a flow diagram of a method for splitting and programming a configuration file in a system with two quad (×4) flash memories and a MCU with two standard (×1) SPI interfaces (e.g., such as the system in FIGS. 5A and 5B), in ×8 passive serial FPGA configuration according to an example embodiment.

Referring to method 700 of FIG. 7, to program a configuration binary file, an original configuration binary file 701 is provided as input to a programmer utility tool 702 (e.g., FPGA project). The utility tool 702 may split the binary file 701 into equal halves (configuration files 701A-701B), where each byte is split into two nibbles. The split files 701A-701B may then be sent to the MCU 703, for example, over a USB interface. The MCU 703 may then send the first split file 701A to a first flash memory 704 (e.g., QSPI flash memory), for example, over a hardware SPI interface, and the second split file 701B to a second flash memory 705 (e.g., QSPI flash memory), for example, over a GPIO SPI interface.

Figure 8:
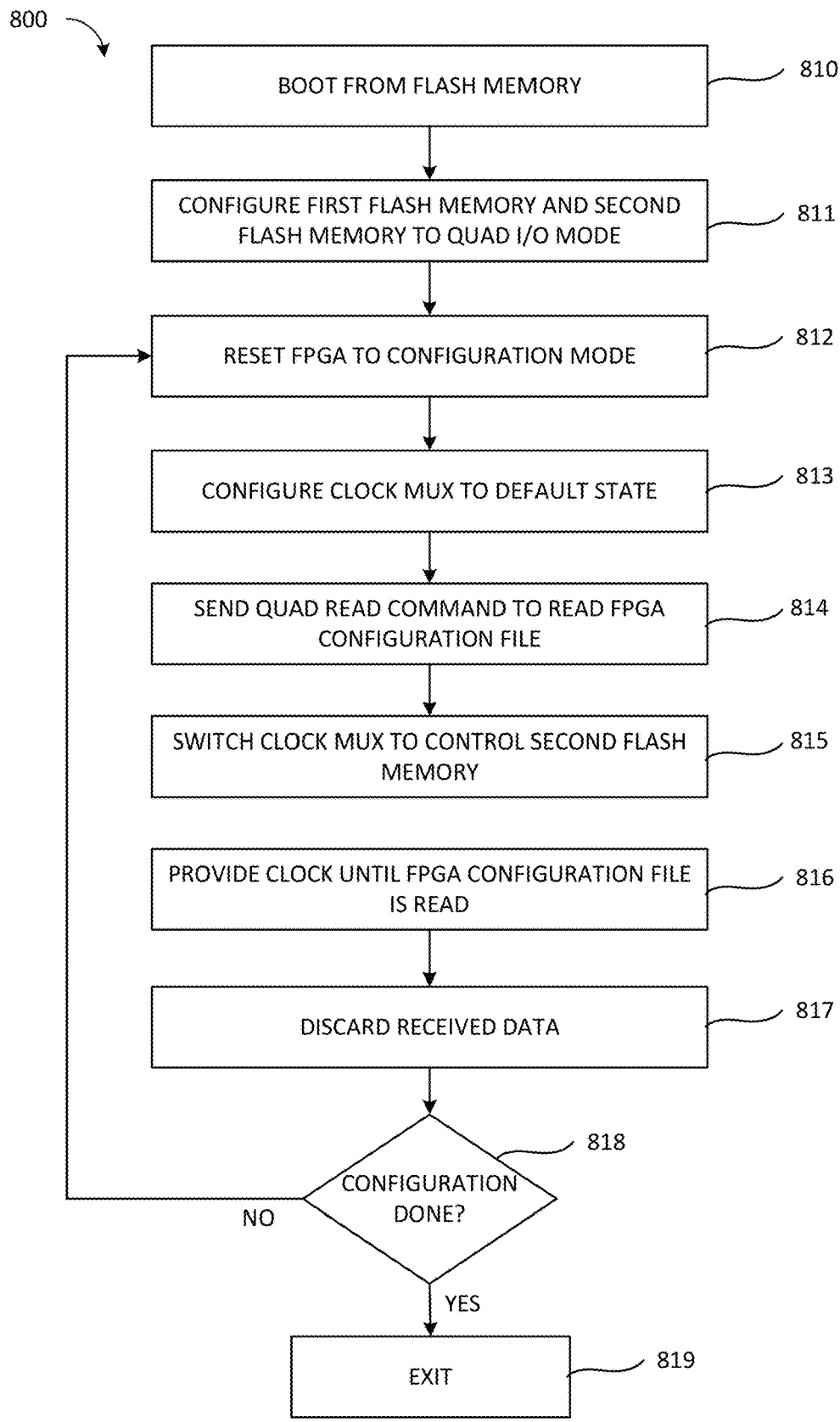
FIG. 8 illustrates a flow diagram of a method for configuring a system with two quad (×4) SPI flash memories and an MCU with two standard (×1) SPI interfaces, in ×8 passive serial FPGA configuration according to an embodiment.

FIG. 8 illustrates a flow diagram of a method for configuring a system with two quad (×4) flash memories and a MCU with two standard (×1) SPI interfaces (e.g., such as the system in FIGS. 5A and 5B), in ×8 passive serial FPGA configuration according to an example embodiment. Method 800 may be implemented as firmware and bit-banged SPI.

Referring to FIG. 8, at block 810, the MCU logic flow may begin with the MCU booting from a first flash memory (e.g., flash memory 503 of FIG. 5A/5B). At block 811, the MCU may configure the two flash memories (e.g., flash memories 503-504 of FIG. 5A/5B) to a Quad input/output (IO) mode. At block 812, the MCU may reset the FPGA (e.g., FPGA 502 of FIG. 5A/5B) to configuration mode, for example, by toggling a CRESET pin. At block 813, the MCU may configure a clock MUX to a default state. At block 814, the MCU may send a Quad Read command to the first flash memory, for example over a hardware SPI interface, and to the second flash memory, for example over the GPIO SPI interface, to read first data of an FPGA configuration file and second data of the FPGA configuration file. At block 815, the MCU may switch the clock MUX to provide its clock from the hardware SPI interface to the second flash memory, where the hardware SPI interface can support clock frequencies, for example, up to 30 MHz. At block 816, the MCU may continuously provide the hardware SPI clock signal until the FPGA configuration file is read out. At block 817, the data received over the hardware SPI interface and/or the GPIO SPI interface may be discarded by the MCU while the FPGA gets configured. When the FPGA configuration file is entirely read out, at block 818, the MCU may determine whether the configuration is completed. If so, the MCU exists the logic flow; otherwise, the MCU may proceed to block 812 to reset the FPGA back into configuration mode and configure the clock MUX to default state (block 813).

Figure 9A:
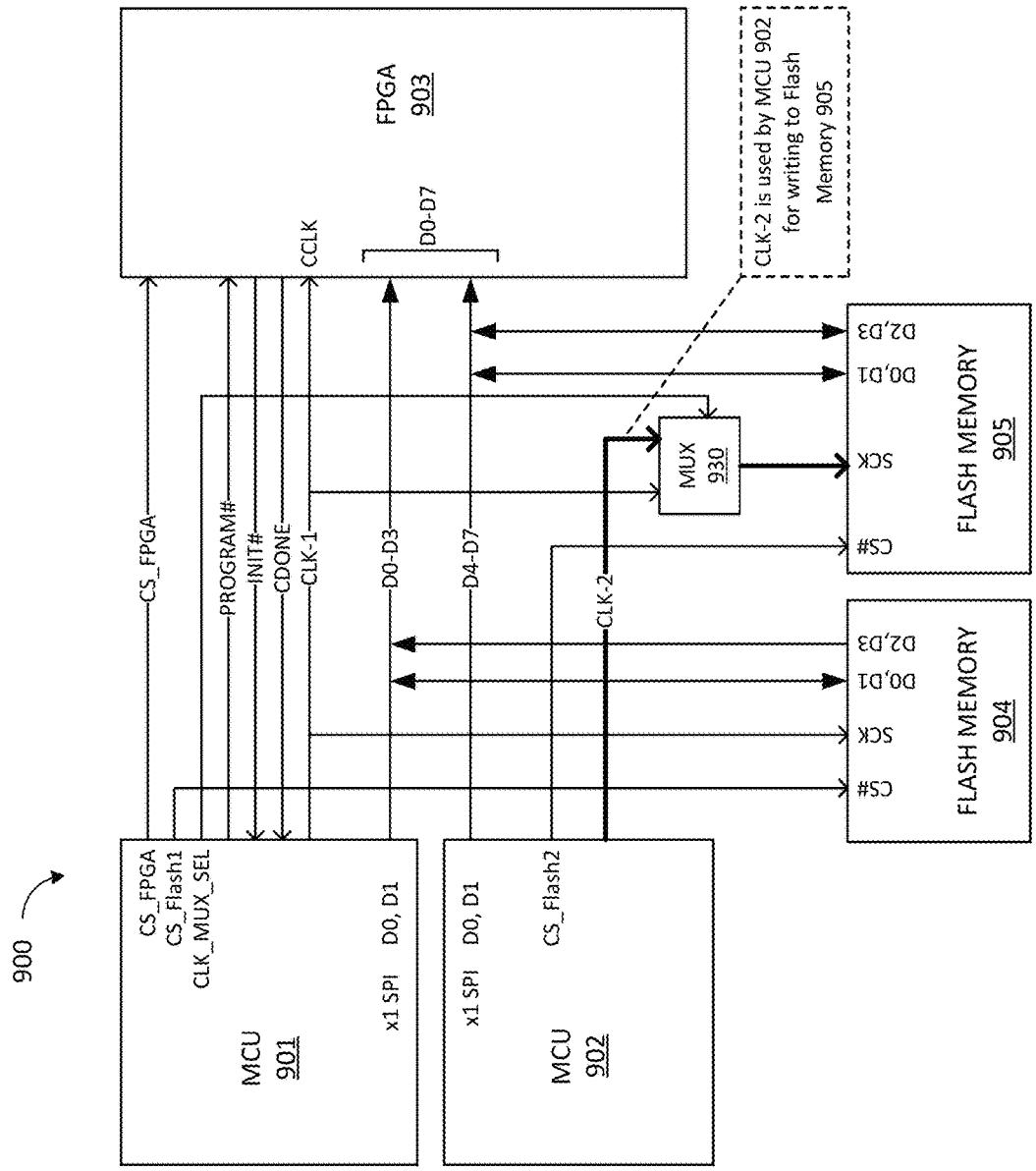
FIGS. 9A-9B illustrate block diagrams of write and read sequences, respectively, for a system with two quad (×4) SPI flash memories and two MCUs each with a standard (×1) SPI interface, in ×8 passive serial FPGA configuration according to an example embodiment.

FIG. 9A illustrates a block diagram of a write sequence for a system with two quad (×4) SPI flash memories and two MCUs, each with a standard (×1) SPI interface, in ×8 passive serial FPGA configuration according to an example embodiment. In system 900 of FIG. 9A, a MCU (e.g., MCU 901) may be designated as the master, and the other MCU (e.g., MCU 902) may be designated as the slave. In system 900, each of the master and slave MCUs is coupled to FPGA 903 and to two quad (×4) flash memories 904-905 over a respective standard (×1) SPI interface. A clock multiplexer (MUX) 930 may be coupled the second flash memory 905 to multiplex the master SPI clock (CLK-1) and the slave SPI clock (CLK-2) that are provided to the FPGA 903 from the master MCU and the slave MCU respectively.

In an embodiment, to configure the FPGA 903 in passive serial ×8 mode, the master and slave MCUs may issue respective Quad Read commands to the flash memories 904-905. The SPI clock from the master MCU may be routed to both flash memories 904-905, with the SPI clock being routed to the second flash memory 905 through the MUX 930 (e.g., 2:1 MUX) to ensure data integrity and synchronization during FPGA configuration. The master MCU may continuously send its SPI clock to both flash memories 904-905 until the entire FPGA configuration file is read out on the respective SPI interfaces. The SPI interface within each of the master and slave MCUs may then discard the received FPGA configuration data at their respective ends, while the FPGA 903 is getting configured.

Figure 9B:
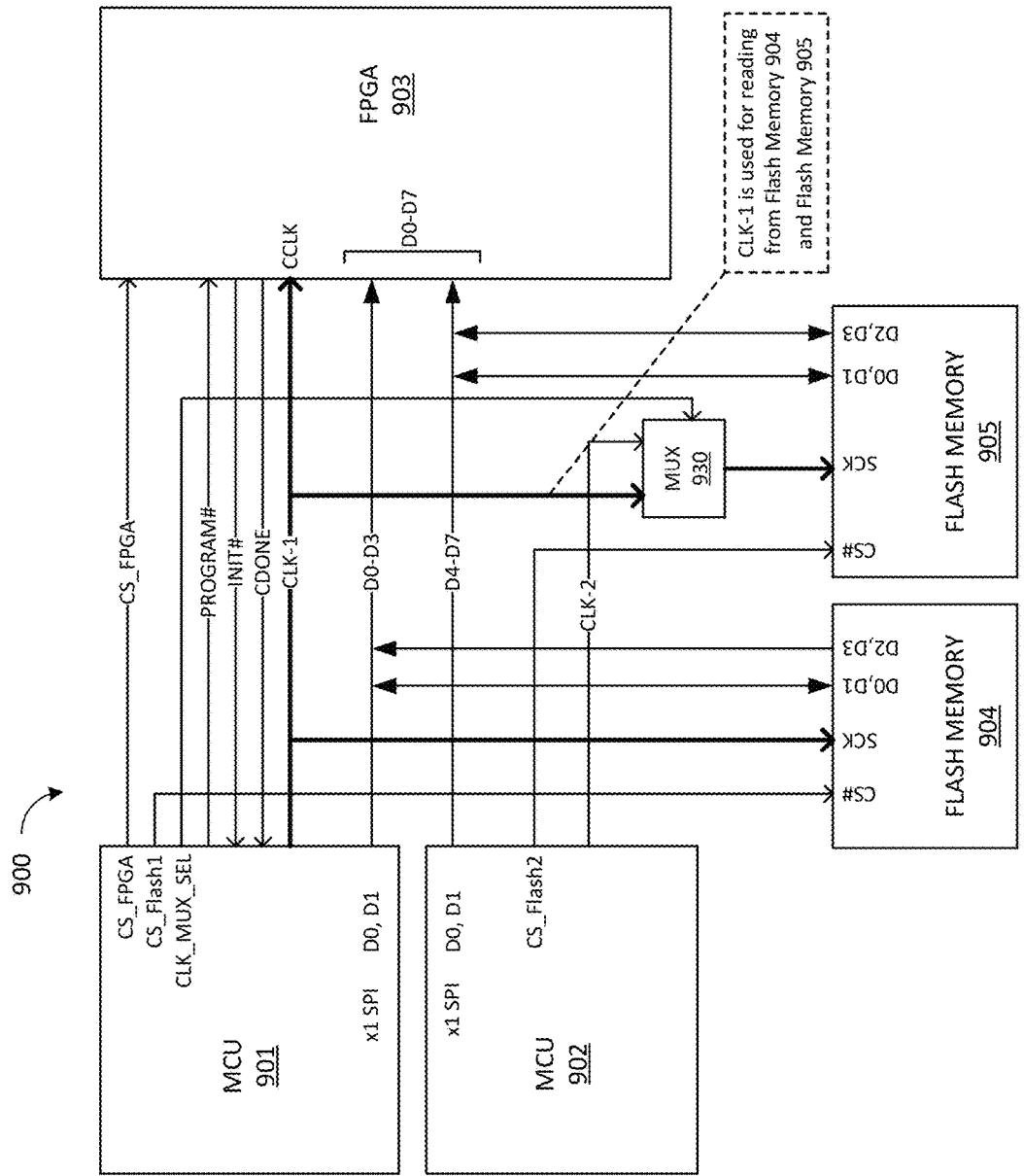

FIG. 9B illustrates a block diagram of a read sequence for a system with two quad (×4) flash memories and two MCUs each with a standard (×1) SPI interface, in ×8 passive serial FPGA configuration according to an example embodiment.

In the system 900 of FIG. 9B, an MCU (e.g., MCU 901) may be designated as the master, and the other MCU (e.g., e.g., MCU 902) may be designated as the slave. Each of the master and slave MCUs are coupled to the FPGA 903 and to two quad (×4) flash memories 904-905 over a respective standard (×1) SPI interface. A clock MUX 930 may be coupled the second flash memory 905 to multiplex the master SPI clock (CLK-1) and the slave SPI clock (CLK-2) that are provided to the FPGA 903 from the master MCU and the slave MCU, respectively.

To configure the FPGA 903 in passive serial ×8 mode, the master and slave MCUs may issue respective Quad Read commands to the two flash memories 904-905. The SPI clock from the master MCU may be routed to both flash memories, with the SPI clock being routed to the second flash memory 905 through the MUX 930 (e.g., 2:1 MUX) to ensure data integrity and synchronization during FPGA configuration. The master MCU may continuously send its SPI clock to both flash memories 904-905 until the entire FPGA configuration file is read out on the respective SPI interfaces. The SPI interface within each of the master and slave MCUs may then discard the received FPGA configuration data at their respective ends, while the FPGA 903 is getting configured.

Figure 10A:
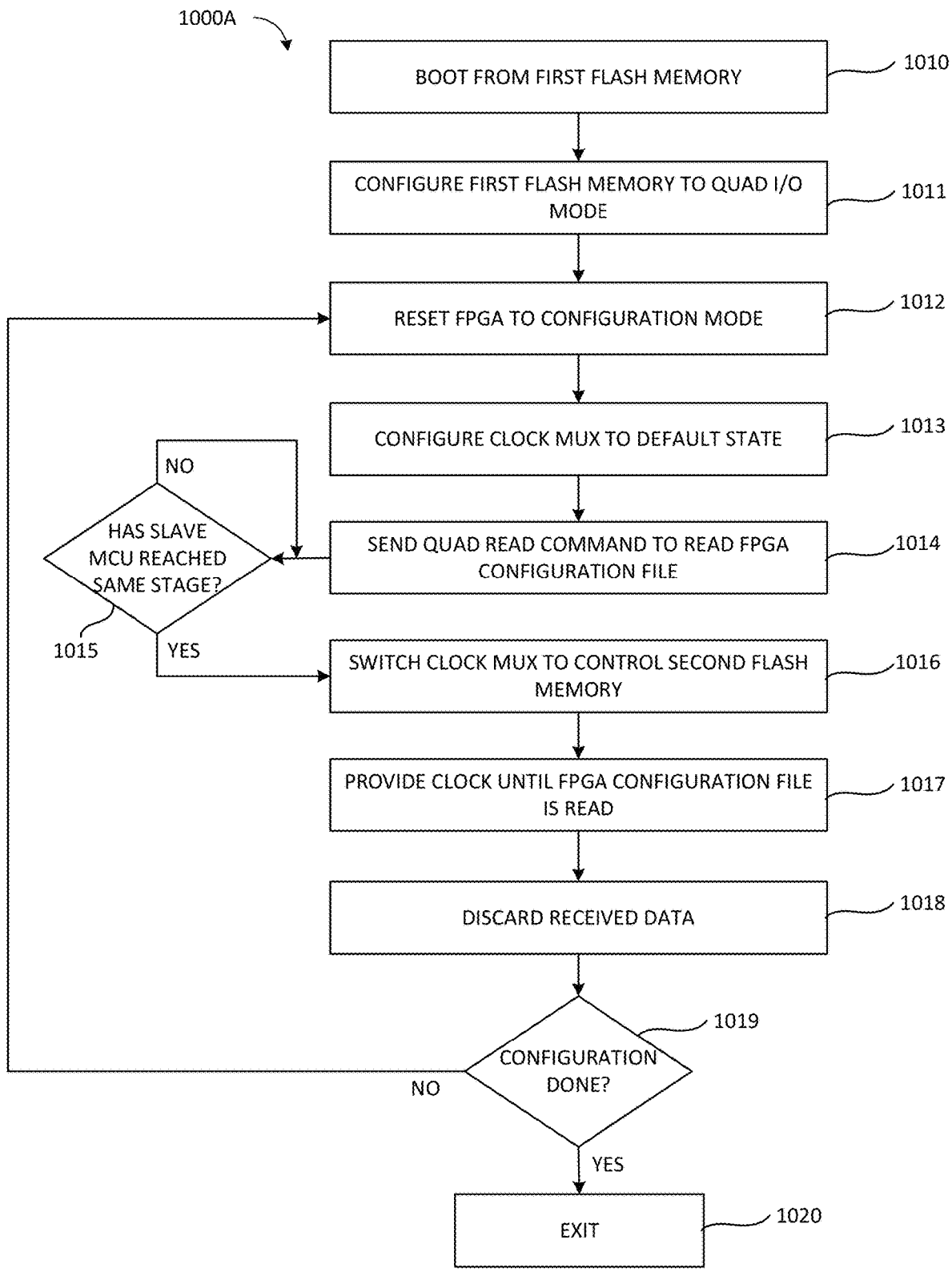
FIGS. 10A-10B illustrates flow diagrams of master and slave methods for configuring a system with two quad (×4) SPI flash memories and two (master and slave) MCUs with standard SPI interfaces (×1), in ×8 passive serial FPGA configuration according to some embodiments.
Figure 10B:
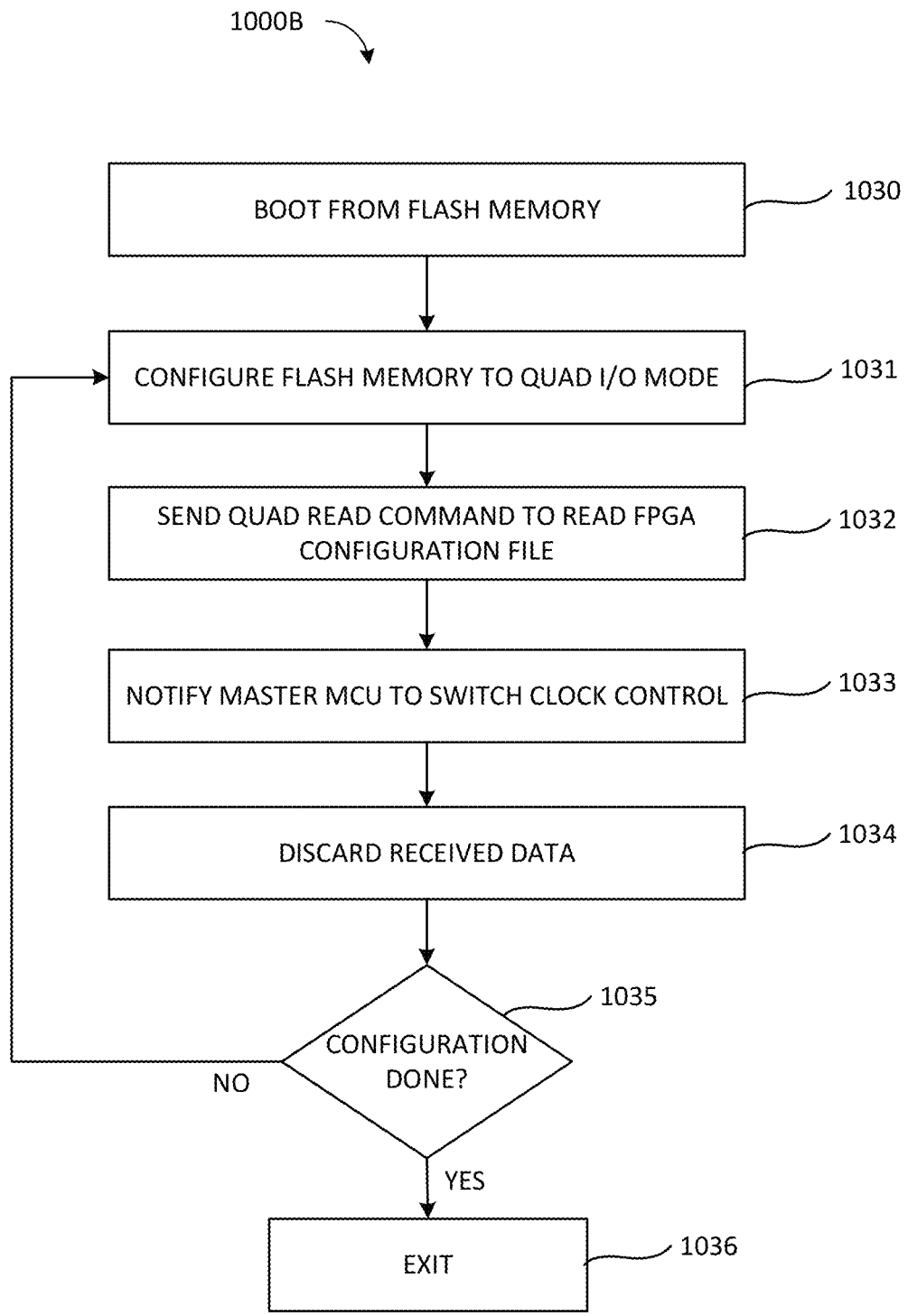

FIGS. 10A-10B illustrate flow diagrams of master and slave methods for configuring a system with two quad (×4) SPI flash memories and two (master and slave) MCUs with standard SPI interfaces (×1) (e.g., such as the system in FIGS. 9A and 9B), in ×8 passive serial FPGA configuration according to an example embodiment.

Referring to methods 1000A and 1000B of FIGS. 10A-10B, at blocks 1010 and 1030, the configuration flow starts with the master and slave MCUs (e.g., MCUs 901-902 of FIG. 9A/9B) booting from the two flash memories (e.g., flash memories 904-905 of FIG. 9A/9B), respectively. At blocks 1011 and 1031, the master and slave MCUs may configure the two flash memories to Quad IO mode, respectively. At block 1012, the master MCU may reset the FPGA (e.g., FPGA 903 of FIG. 9A/9B) to configuration mode, for example, by toggling a CRESET pin. At block 1013, the master MCU may configure a clock MUX (e.g., MUX 930 of FIG. 9A/9B) to default state. At blocks 1014 and 1032, the master and slave MCUs may send respective Quad Read commands to the two flash memories over their respective SPI interfaces. Referring to method 1000A, in block 1015, the master MCU may wait for an acknowledgement signal from the slave MCU that the Quad-Read command step is complete. At block 1016, the master MCU may switch the clock MUX to provide its SPI clock signal to the second flash memory to control the second flash memory if it is determined that the slave MCU has reached the same stage. Otherwise, the master MCU returns to block 1015 to continue waiting for the acknowledgement signal from the slave MCU that the Quad-Read command step is complete. At block 1017, the master MCU may continuously provide its SPI clock signal until the FPGA configuration file is read out. Referring to method 1000B, at block 1033, the slave MCU may notify the master MCU to switch the clock control (e.g., switch the clock MUX). Referring to methods 1000A and 1000B, at blocks 1018 and 1034, both the master and slave MCUs may discard the FPGA configuration data they receive over their respective SPI interfaces while the FPGA gets configured. When the FPGA configuration file is fully read out, at blocks 1019 and 1035, the master and slave MCUs may respectively determine whether the configuration is completed. If so, the master and slave MCUs respectively exit the logic flow (blocks 1020 and 1036). Otherwise, the master MCU proceeds to block 1012 to reset the FPGA back into configuration mode and configures the clock MUX to default state (block 1013), and the slave MCU returns to block 1031 to configure the second flash memory to Quad IO mode.

Figure 11A:
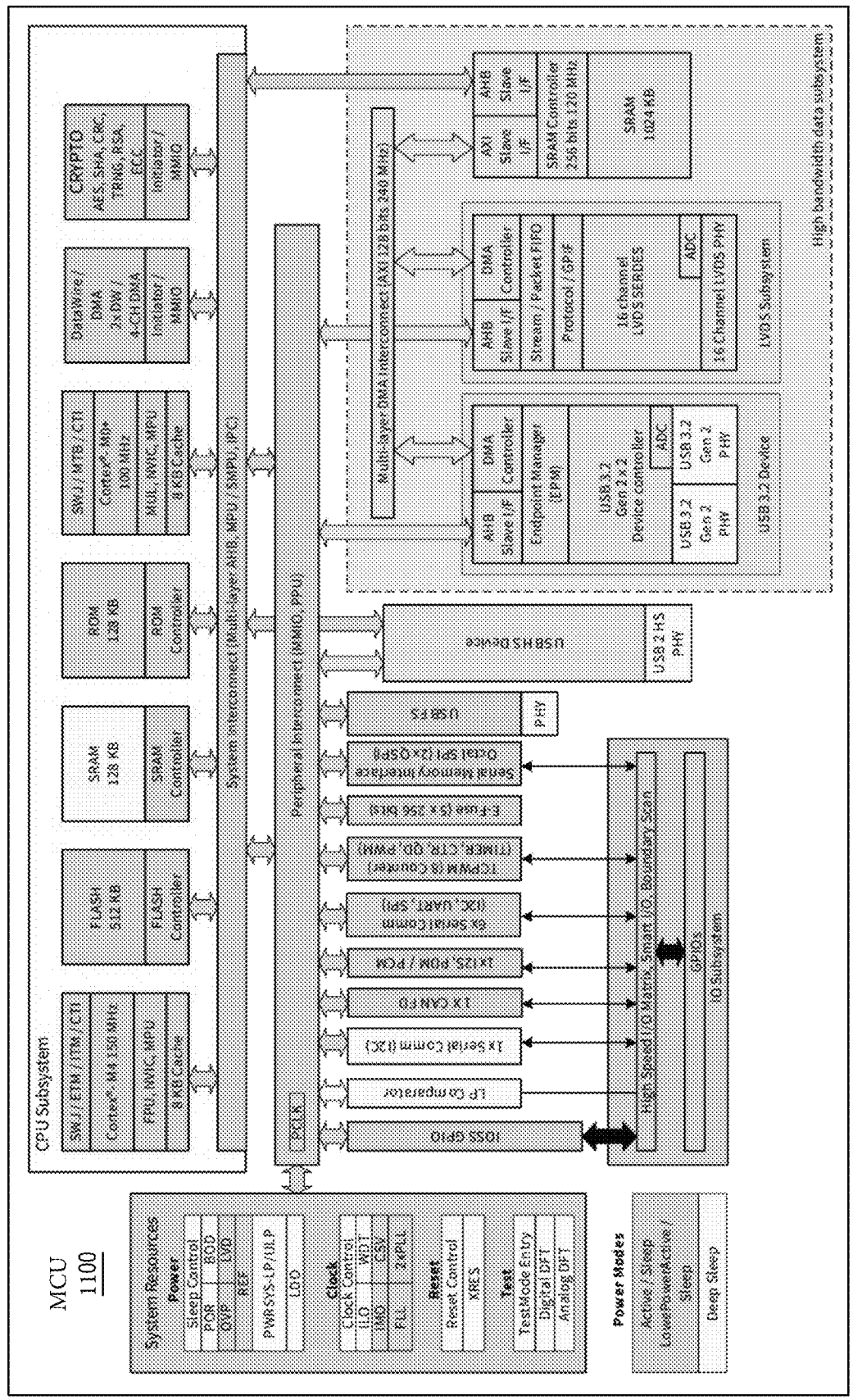
FIG. 11A illustrates a block diagram of an example IC MCU for various embodiments of the techniques described herein.

FIG. 11A illustrates a block diagram of an example integrated circuit (IC) MCU for various embodiments of the techniques described herein. In FIG. 11A, MCU 1100 is illustrated. MCU 1100 may include a peripheral high bandwidth (HBW) subsystem including components for use in high-speed USB communications. The peripheral HBW subsystem may be connected to a peripheral interconnect including a clocking module with a peripheral clock (PCLK) for providing clock signals to the various components of MCU 1100. The peripheral interconnect may be a peripheral bus, such as a single-level or multi-level advanced high-performance bus (AHB), and may provide a data and control interface between the peripheral HBW subsystem, the CPU subsystem, and the various IO and system resources. The peripheral interconnect may include controller circuits, such as direct memory access (DMA) controllers, which may be programmed to transfer data between peripheral blocks without input by, control of, or burden on the CPU subsystem.

The peripheral interconnect may be used to couple components of the peripheral HBW subsystem to other components of MCU 1100. Coupled to the peripheral interconnect may be a number of general purpose input/outputs (GPIOs) for sending and receiving signals. The GPIOs may include circuits configured to implement various functions such as pull-up, pull-down, input threshold select, input and output buffer enabling/disable, single multiplexing, etc. One or more timer/counter/pulse-width modulator (TCPWM) may also be coupled to the peripheral interconnect and include circuitry for implementing timing circuits (timers), counters, pulse-width modulators (PWMs) decoders, and other digital functions that may operate on I/O signals and provide digital signals to various components of MCU 1100. The peripheral interconnect may also be coupled to one or more E-Fuse blocks and USB Full-Speed (FS) and/or High-Speed (HS) devices. The peripheral interconnect may also be coupled to one or more serial communication blocks (SCBs) for implementation of serial communication interfaces such as I2C, serial peripheral interface (SPI), universal asynchronous receiver/transmitter (UART), controller area network (CAN), clock extension peripheral interface (CXPI), etc. In addition, the peripheral interconnect is also coupled to one or more serial memory interfaces such as QSPI and Octal SPI, that can be configured in accordance with the techniques for using an MCU with a standard SPI interface (×1) to support ×4/×8/×16/×32 passive serial FPGA configuration described herein.

The GPIOs, TCPWMs, and SCBs may be coupled through an input/output (I/O) subsystem, which may include a high-speed (HS) I/O matrix, to a number of output pins.

The peripheral HBW subsystem includes a multilayer direct memory access (DMA) interconnect, such as an Advanced extensible Interface (AXI) bus. The DMA interconnect is coupled to a USB3.2 device, a static random access memory (SRAM), and an LVDS subsystem. The DMA interconnect provides DMA data transfers from the LVDS subsystem to the USB3.2 device at speeds up to 10 Gbps for USB3.2 Gen 2 or 20 Gbps for USB3.2 Gen 2×2 based host systems. The SRAM (e.g., 1024 KB) is included in the peripheral HBW subsystem to provide buffering for data. The data is transferred over the DMA interconnect supporting 20 Gbps operation. The peripheral HBW subsystem interfaces to a system interconnect for data transfer to other low bandwidth peripherals and to the peripheral interconnect for configuration.

The DMA interconnect may include a DMA controller that supports the following features: multiple simultaneous streams; maximum throughput of 20 Gbps; configurable write and read socket memory to match the data rate of image streaming to a USB host; configuration from the CPU on the fly, where once configured the DMA controller can operate automatically and transfer the video stream from the LVDS subsystem to the USB3.2 device without any CPU intervention; provision to add configurable headers and footers with every data packet (payload) without CPU intervention; ability to wrap the USB packet at the end of frame using control signal and also update the header/footer without CPU intervention; one "Audio-IN" and one "Audio-OUT" streams from/to I2S interface.

The USB3.2 device may be compliant with USB 3.2 specification, and can support various USB features including: 32 endpoints; function endpoints 15 IN and 15 OUT and 2 control endpoints, where each function endpoint can be configured to BULK, ISO or INTERRUPT type; BULK endpoint streaming; simultaneous transactions across multiple IN endpoints; low power state; support for UVC, UAC, WinUSB, libusb, USB3Vision driver specific requirements; USB Precision Time Measurement (PTM); USB bus-powered and self-powered mode; detection of USB-C connector orientation using CC lines with external Rd resistors.

The LVDS subsystem includes two links, where each link can be configured independently to support an LVDS interface, a sub-LVDS interface, and a LVCMOS parallel interface. The LVDS subsystem also includes a programmable protocol layer with support for two independent links and capability to combine data from both links. Each independent link may be configured to support the following features: deserialization of data; storing data on the same link in separate buffers based on control signals to support virtual channel (multiple streams); capturing the time of frame start with +/−2 uS accuracy using the PTM feature; generation of configurable test patterns that can be used to test streaming of data from an application device to PC without using any external video source.

MCU 1100 may also include a central processing unit (CPU) subsystem for processing commands, storing program information, and data. The CPU subsystem may include one or more processing units for executing instructions and reading from and writing to memory locations in a number of memories. The processing unit may be a processor (e.g., CPU) suitable for operation in an integrated circuit (IC) or a system-on-chip (SOC) device. In some embodiments, the processing unit may be optimized for low-power operation with extensive clock gating. In such embodiment, various internal control circuits may be implemented for processing unit operation in various power states. For example, the processing unit may include a wake-up interrupt controller (WIC) configured to wake the processing unit up from a sleep state, allowing power to be switched off when the IC or SOC is in a sleep state. The CPU subsystem may include one or more memories, including a flash memory, a static random access memory (SRAM), and a read-only memory (ROM). The flash memory may be a non-volatile memory (NAND flash, NOR flash, etc.) configured for storing data, programs, and/or other firmware instructions. The flash memory may include a read accelerator and may improve access times by integration within the CPU subsystem. The SRAM may be a volatile memory configured for storing data and firmware instructions accessible by a processing unit. The ROM may be configured to store boot-up routines, configuration parameters, and other firmware parameters and settings that do not change during operation of MCU 1100. The SRAM and the ROM may have associated control circuits. The processing unit and the memories may be coupled to a system interconnect to route signals to and from the various components of the CPU subsystem to other blocks or modules of MCU 1100. The system interconnect may be implemented as a system bus such as a single-level or multi-level AHB. The system interconnect may be configured as an interface to couple the various components of the CPU subsystem to each other. The system interconnect may be coupled to the peripheral interconnect to provide signal paths between the components of the CPU subsystem and the peripheral HBW subsystem.

MCU 1100 may also include a number of system resources, including a power module, a clock module, a reset module, and a test module. The power module may include a sleep control module, a wake-up interrupt control (WIC) module, a power-on-reset (POR) module, a number of voltage references (REF), and a PWRSYS module. In some embodiments, the power module may include circuits that allow MCU 1100 to draw and/or provide power from/to external sources at different voltage and/or current levels and to support controller operation in different power states, such as active, low-power, or sleep. In various embodiments, more power states may be implemented as MCU 1100 throttles back operation to achieve a desired power consumption or output. The clock module may include a clock control module, a watchdog timer (WDT), an internal low-speed oscillator (ILO), and an internal main oscillator (IMO). The reset module may include a reset control module and an external reset (XRES) module. The test module may include a module to control and enter a test mode as well as testing control modules for analog and digital functions (digital test and analog DFT).

MCU 1100 may be implemented in a monolithic (e.g., single) semiconductor die. In other embodiments, various portions or modules of MCU 1100 may in implemented on different semiconductor dies. For example, memory modules of the CPU subsystem may be on-chip or separate. In still other embodiments, separate-die circuits may be packaged into a single multi-chip module.

MCU 1100 may be used in various system applications, such as HDMI-to-USB3 video/image capture, machine vision cameras, and consumer cameras (e.g., such as USB cameras).

Figure 11B:
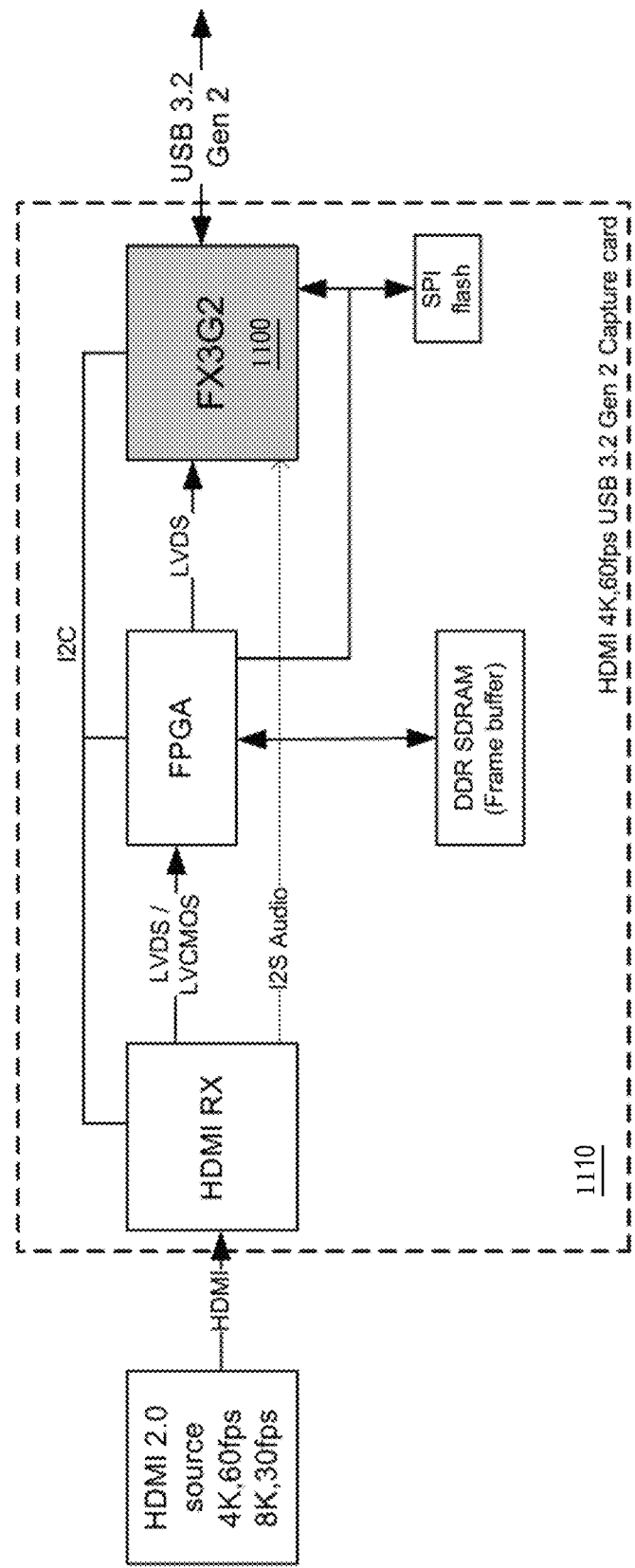
FIG. 11B illustrates a block diagram of an example High-Definition Multimedia Interface to Universal Serial Bus 3.x (HDMI-to-USB3) capture card device using an MCU with a standard SPI interface (×1) to support ×4/×8/×16/×32 passive serial FPGA configuration, in accordance with the techniques described herein.

FIG. 11B illustrates a block diagram of an example HDMI-to-USB3 capture card device 1110 including MCU 1100 (also referred to as FX3G2) with a standard SPI interface (×1) to support ×4/×8/×16/×32 passive serial FPGA configuration, in accordance with the techniques described herein.

Device 1110 may be included in a system (e.g., dongle) that converts HDMI input from any camera (e.g., DSLR, GoPro, etc.) into USB data for applications like video conferencing, document camera, and gaming controllers. In such systems, device 1110 may include the following features to enable HDMI to USB3 capture: connect to HDMI 2.0 receivers with LVDS links or LVCMOS interface using an FPGA; use an FPGA to re-arrange the pixel data bits to match with the color formats supported by UVC player; use an FPGA to support an external DDR SDRAM based frame buffer to store minimum two video frames from the HDMI receiver to send complete frame data to USB hosts; independent I2C master interface to control the HDMI receiver;

I2S receiver interface to connect the HDMI receiver's audio output; SPI/QSPI/2×QSPI interface for fast downloading of FPGA configuration binary on every bootup; support several USB endpoints (e.g., video end point, audio end point, debug end point, HID end point); support USB Type-C connector reversibility; support API library functions to implement various features of the video capture application for customer use; consume less than 1 W power so that total power consumption of the device can be less than 4.5 W and can be bus-powered by host PCs.

Figure 11C:
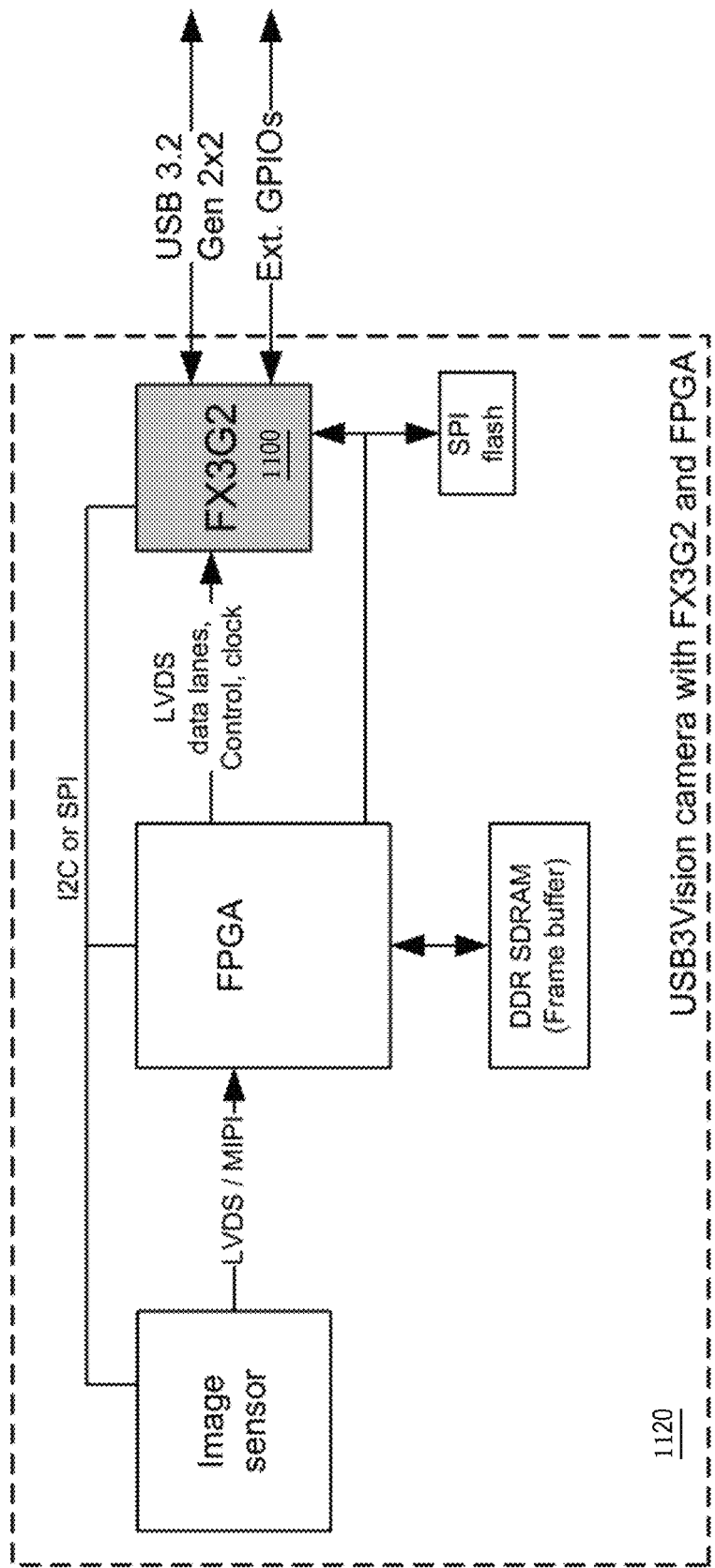
FIG. 11C illustrates a block diagram of an example machine vision camera device using an MCU with a standard SPI interface (×1) to support ×4/×8/×16/×32 passive serial FPGA configuration, in accordance with the techniques described herein.

FIG. 11C illustrates a block diagram of an example machine vision camera device 1120 including MCU 1100 with a standard SPI interface (×1) to support ×4/×8/×16/×32 passive serial FPGA configuration, in accordance with the techniques described herein. In FIG. 11C, MCU 1100 is illustrated and referred to as FX3G2.

In some embodiments, a USB machine vision camera (e.g., such as device 1120) may be used to capture images from various activities such as an assembly line, plant, or process. When there is no activity in the assembly line, the USB host can place the USB camera in Suspend mode (U3 mode) until the assembly line activity resumes. This can happen for example, every one second (1000 ms). By using the techniques described herein, device 1120 can quickly reconfigure the FPGA and complete the video capture and transmission to the host within a short time. Once the video capture and transmission is completed, the camera will RESET the FPGA and go back to the USB Suspend mode.

In such embodiments, device 1120 may include the following features to support the machine vision application: LVDS/LVCMOS interface to connect image sensors to MCU 1100 with an FPGA; two LVCMOS GPIOs for external Strobe and Sync functionality; configurable LVDS sensor interface to connect two image sensors of 8 data lanes each for a dual sensor based industrial 3D scanner application; USB3Vision protocol specific requirements per a USB3Vision specification; API library functions to implement various features of the USB3Vision protocol for customer use; use of an FPGA to support a DDR SDRAM based frame buffer to "resend" a complete frame if requested by the host.

Figure 11D:
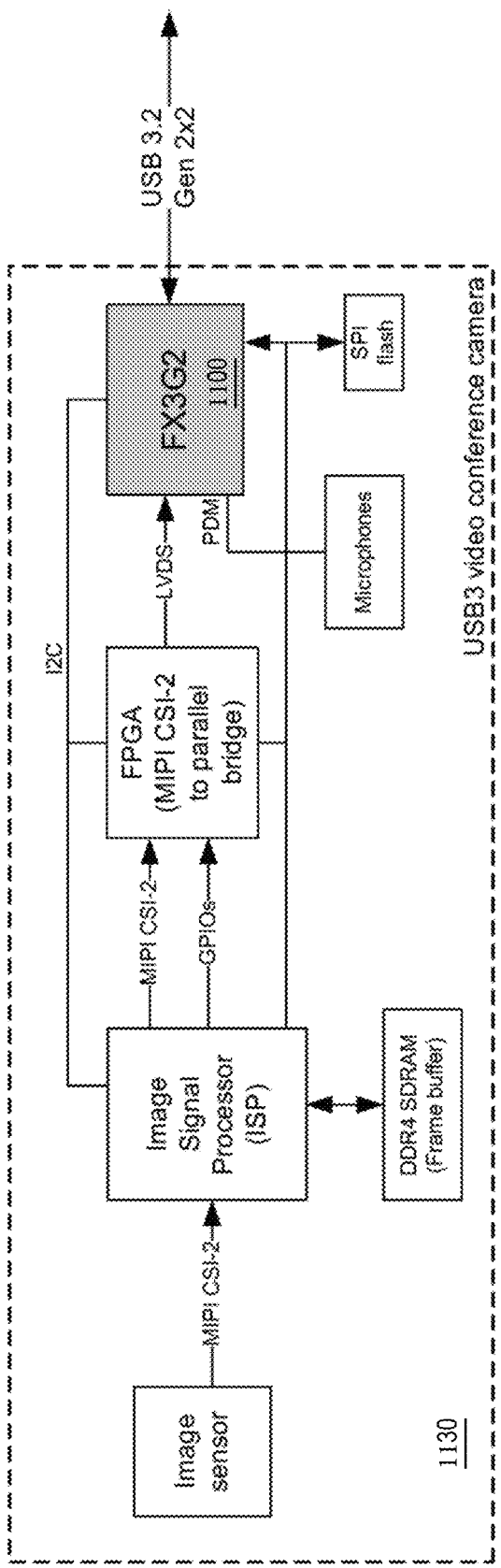
FIG. 11D illustrates a block diagram of an example consumer camera device using an MCU with a standard SPI interface (×1) to support ×4/×8/×16/×32 passive serial FPGA configuration, in accordance with the techniques described herein.

FIG. 11D illustrates a block diagram of an example consumer camera device 1130 including MCU 1100 with a standard SPI interface (×1) to support ×4/×8/×16/×32 passive serial FPGA configuration, in accordance with the techniques described herein. In FIG. 11D, MCU 1100 is illustrated and referred to as FX3G2.

In some embodiments, device 1130 may be implemented in USB video cameras, and such implementations would be possible only because of the capability to configure the FPGA by 4 to 32 times faster than standard SPI-based configurations. For example, in USB cameras, when a USB host is not requesting video data, the PC host will put the USB device in "Low power mode" (U3-USB Suspend mode). In this mode the relevant USB specification mandates 2.5 mA as the max current that is allowed to be consumed by the device. If this requirement is not met, then the USB device cannot pass USB compliance tests in bus powered mode. In another example, in USB video conference cameras or webcams, a PC host will place the USB camera/webcam in USB suspend mode (U3 mode) until the video streaming application (e.g., WebEx, MS Teams, etc.) is opened and camera-sharing is enabled. During this time the USB controller will be in low power mode and will also keep the FPGA in RESET. Once the host requests the USB camera/webcam to move to USB Active mode (U0 mode), the USB controller will wake up and quickly (e.g., within 224 mS) reconfigure the FPGA using the techniques described herein. Once the meeting is over, the camera will go back to suspend mode (U3) and put the FPGA in reset.

In such embodiments, device 1130 may include the following features to support the consumer camera application: support for up to 4K (UHD), 60 fps YUV422 (16 bits/pixel), video; GPIOs to control LED light, focus, still capture, zoom IN/OUT, rotate picture etc.; support for microphones with PDM interface; support for SPI-based ISP firmware and FPGA configuration storage on SPI flash and download; API library functions to implement the various features of the UVC+UAC camera applications.

In the above description, some technical details are presented in terms of algorithms and symbolic representations of operations performed by firmware and/or within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "allocating," "dynamically allocating," "redistributing," "ignoring," "reallocating," "detecting," "performing," "polling," "registering," "monitoring," or the like, refer to the actions and processes of a device, or similar electronic system, that manipulates and transforms data represented as physical (e.g., electronic) quantities within the system's registers and memories into other data similarly represented as physical quantities within the system memories or registers.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to a device for performing the operations herein. Such device may be specially constructed for the required purposes (e.g., an application-specific integrated circuit, ASIC), or it may be an integrated circuit (IC) including a CPU subsystem that can execute instructions stored as firmware in a non-transitory computer-readable storage medium. Such non-transitory computer-readable storage medium may include, but is not limited to, read-only memories (ROMs), random access memories (RAMs), EPROMs, EEPROMs, flash memory, or any type of media suitable for storing electronic instructions. The term "computer-readable storage medium" should be taken to include a single medium that stores one or more sets of instructions. The term "computer-readable medium" should also be taken to include any medium that is capable of storing, encoding, or carrying a set of instructions for execution by a device and that causes the device to perform any one or more of the methodologies of the present embodiments.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A system, comprising:
   a microcontroller unit (MCU) comprising an interface;
   a field-programmable gate array (FPGA) coupled to the MCU over the interface; and
   a flash memory coupled to the MCU and to the FPGA over the interface, the flash memory comprising MCU firmware for the MCU and FPGA configuration data for the FPGA;
   wherein, to perform passive serial configuration of the FPGA, the MCU is operable to at least:
   configure the flash memory to an input/output (IO) mode;
   place the FPGA in a configuration mode;
   send a read command over the interface to the flash memory for the FPGA configuration data; and
   continuously provide a clock signal over the interface to the flash memory until the FPGA configuration data is entirely read;
   wherein in response to the read command, the flash memory is operable to place the FPGA configuration data onto the interface;
   wherein the FPGA is operable to read the FPGA configuration data from the interface and configure the FPGA based on the FPGA configuration data.

2. The system of claim 1, wherein the MCU is further operable to discard the FPGA configuration data received over the interface of the MCU.

3. The system of claim 1, wherein the MCU is further operable to:
   determine whether the configuration of the FPGA is completed; and
   in response to determining that the configuration of the FPGA is not completed, again place the FPGA in the configuration mode, and send another read command over the interface to the flash memory for the FPGA configuration data.

4. The system of claim 1, wherein the MCU is further operable to put the system in standby mode by keeping the FPGA in reset and reconfigure the FPGA when the system enters active mode.

5. The system of claim 1, wherein to place the FPGA in the configuration mode, the MCU is operable to send a configuration command over the interface to place the FPGA in the configuration mode.

6. The system of claim 1, wherein the IO mode is a quad (×4), octal (×8), ×16 or ×32 IO mode.

7. The system of claim 1, wherein the read command is a quad (×4), octal (×8), ×16 or ×32 read command.

8. The system of claim 1, wherein:
   the interface is a serial peripheral interface (SPI) interface; and
   the flash memory is a quad SPI (QSPI) flash memory.

9. A system, comprising:
   a microcontroller unit (MCU) comprising a first interface and a second interface;
   a field-programmable gate array (FPGA) coupled to the MCU over the first interface and the second interface;
   a first flash memory coupled to the MCU and to the FPGA over the first interface, the first flash memory comprising MCU firmware for the MCU and first data of FPGA configuration data for the FPGA; and
   a second flash memory coupled to the MCU and to the FPGA over the second interface, the second flash memory comprising second data of the FPGA configuration data;
   wherein, to perform passive serial configuration of the FPGA, the MCU is operable to at least:
   configure the first flash memory and the second flash memory to an input/output (IO) mode;
   place the FPGA in a configuration mode;
   respectively send a read command over the first interface to the first flash memory for the first data of the FPGA configuration data, and over the second interface to the second flash memory for the second data of the FPGA configuration data; and
   continuously provide a first clock signal over the first interface to the first flash memory and to the second flash memory until the first data and the second data are entirely read;
   wherein in response to the read command, the first flash memory is operable to place the first data onto the first interface, and the second flash memory is operable to place the second data onto the second interface;
   wherein the FPGA is operable to read the first data from the first interface, read the second data from the second interface, and configure the FPGA based on the first data and the second data that collectively form the FPGA configuration data.

10. The system of claim 9, wherein the MCU is further operable to discard the first data received over the first interface, and discard the second data received over the second interface.

11. The system of claim 9, wherein the MCU is further operable to:
   determine whether the configuration of the FPGA is completed; and
   in response to determining that the configuration of the FPGA is not completed, again place the FPGA in the configuration mode, and send another read command over the first interface to the first flash memory for the first data of the FPGA configuration data, and over the second interface to the second flash memory for the second data of the FPGA configuration data.

12. The system of claim 9, further comprising a clock multiplexer coupled to the MCU over the first interface and the second interface;
   wherein the clock multiplexer is operable to multiplex the first clock signal provided by the MCU over the first interface and a second clock signal provided by the MCU over the second interface.

13. The system of claim 12, wherein the MCU is further operable to:
   switch the clock multiplexer to provide the first clock signal to the second flash memory.

14. The system of claim 9, wherein:
   each of the first interface and the second interface is a serial peripheral interface (SPI) interface; and
   each of the first flash memory and the second flash memory is a quad SPI (QSPI) flash memory.

15. The system of claim 9, wherein the MCU is further operable to put the system in standby mode by keeping the FPGA in reset and reconfigure the FPGA when the system enters active mode.

16. The system of claim 9, wherein the IO mode is a quad (×4), octal (×8), ×16 or ×32 IO mode.

17. The system of claim 9, wherein the read command is a quad (×4), octal (×8), ×16 or ×32 read command.

18. A system, comprising:
   a first microcontroller unit (MCU) comprising a first interface;
   a second MCU comprising a second interface;
   a field-programmable gate array (FPGA) coupled to the first MCU over the first interface, and coupled to the second MCU and the second interface;
   a first flash memory coupled to the first MCU and to the FPGA over the first interface, the first flash memory comprising MCU firmware for the MCU and first data of FPGA configuration data for the FPGA; and
   a second flash memory coupled to the second MCU and to the FPGA over the second interface, the second flash memory comprising second data of the FPGA configuration data;
   wherein, to perform passive serial configuration of the FPGA, the first MCU is operable to at least:
      configure the first flash memory to an input/output (IO) mode;
      place the FPGA in a configuration mode;
      send a read command over the first interface to the first flash memory for the first data of the FPGA configuration data; and
      continuously provide a first clock signal over the first interface to the first flash memory until the first data is entirely read.

19. The system of claim 18, wherein the second MCU is operable to at least:
   configure the second flash memory to an input/output (IO) mode;
   send a read command over the second interface to the second flash memory for the second data of the FPGA configuration data; and
   notify the first MCU to switch a clock multiplexer to provide the first clock signal to the second flash memory, wherein the first MCU continuously provides the first clock signal over the first interface to the second flash memory until the second data is entirely read;
   wherein:
   in response to the read command from the first MCU, the first flash memory is operable to place the first data onto the first interface;
   in response to the read command from the second MCU, the second flash memory is operable to place the second data onto the second interface;
   the FPGA is operable to read the first data from the first interface, read the second data from the second interface, and configure the FPGA based on the first data and the second data that collectively form the FPGA configuration data.

20. The system of claim 19, further comprising the clock multiplexer, the clock multiplexer coupled to the first MCU over the first interface and coupled to the second MCU over the second interface;
   wherein the clock multiplexer is operable to multiplex the first clock signal provided by the first MCU over the first interface and a second clock signal provided by the second MCU over the second interface.

* * * * *